(12) United States Patent  (10) Patent No.: US 8,613,674 B2
Vago et al.  (45) Date of Patent: Dec. 24, 2013

(54) METHODS, DEVICES, AND SYSTEMS FOR VIDEO GAMING

(76) Inventors: James Charles Vago, Cincinnati, OH (US); Mark Anthony Charles, Washington, DC (US)

(*) Notice: Subject to any disclaimer, the term of this patent is extended or adjusted under 35 U.S.C. 154(b) by 0 days.

(21) Appl. No.: 13/274,388

(22) Filed: Oct. 17, 2011

(65) Prior Publication Data

US 2012/0094757 A1    Apr. 19, 2012

Related U.S. Application Data

(60) Provisional application No. 61/455,221, filed on Oct. 16, 2010.

(51) Int. Cl.
*A63F 13/12* (2006.01)

(52) U.S. Cl.
USPC .................................. 463/42; 463/31

(58) Field of Classification Search
USPC .......................................................... 463/31
See application file for complete search history.

(56) References Cited

U.S. PATENT DOCUMENTS

| | | | |
|---|---|---|---|
| 5,761,485 A | 6/1998 | Muyan | |
| 5,762,555 A * | 6/1998 | Crump et al. | 463/41 |
| 5,771,455 A | 6/1998 | Kennedy, III et al. | |
| 5,822,523 A | 10/1998 | Rothschild et al. | |
| 6,226,686 B1 | 5/2001 | Rothschild et al. | |
| 6,429,849 B1 | 8/2002 | An et al. | |
| 6,728,729 B1 | 4/2004 | Jawa et al. | |
| 6,812,923 B2 | 11/2004 | Gosalia et al. | |
| 6,862,027 B2 | 3/2005 | Andrews et al. | |
| 6,935,959 B2 | 8/2005 | Danieli et al. | |
| 7,090,582 B2 | 8/2006 | Danieli et al. | |
| 7,149,541 B2 | 12/2006 | Rautila | |
| 7,203,835 B2 | 4/2007 | Multerer et al. | |
| 7,218,739 B2 | 5/2007 | Multerer et al. | |
| 7,288,028 B2 | 10/2007 | Rodriquez et al. | |
| 7,311,608 B1 | 12/2007 | Danieli et al. | |
| 7,395,051 B2 | 7/2008 | Griffin | |
| 7,455,590 B2 | 11/2008 | Hansen et al. | |

(Continued)

FOREIGN PATENT DOCUMENTS

| | | |
|---|---|---|
| WO | 2007/061553 | 5/2007 |
| WO | 2009/086221 | 7/2009 |
| WO | 2009/154831 | 12/2009 |

OTHER PUBLICATIONS

Screen Capture of XBOX Live Website—Sep. 2009.

(Continued)

*Primary Examiner* — Dmitry Suhol
*Assistant Examiner* — Jay Liddle

(57) ABSTRACT

There is a game console, wherein the game console further comprises a set of computer readable instructions for: transmitting login data to at least one game server, wherein the at least one game server is associated with a game service for a gaming community; transmitting data from the game console to the at least one game server to associate the first gamer and a second gamer as members of a semi-permanent gaming clan using the personally identifiable data for the first gamer and the second gamer, wherein the gaming clan has a clan identifier associated therewith; c) transmitting data from the game console to the at least one game server to establish one of the first gamer and the second gamer as a semi-permanent clan leader.

18 Claims, 18 Drawing Sheets

(56) References Cited

U.S. PATENT DOCUMENTS

| | | | |
|---|---|---|---|
| 7,464,272 B2 | 12/2008 | Danieli | |
| 7,469,381 B2 | 12/2008 | Ording | |
| 7,496,200 B2 | 2/2009 | Multerer et al. | |
| 7,496,202 B2 | 2/2009 | Multerer et al. | |
| 7,512,235 B2 | 3/2009 | Multerer et al. | |
| 7,515,431 B1 | 4/2009 | Zadesky et al. | |
| 7,542,273 B2 | 6/2009 | Laycock et al. | |
| 7,606,555 B2 | 10/2009 | Walsh et al. | |
| 7,649,744 B2 | 1/2010 | Zadesky et al. | |
| 7,650,495 B2 | 1/2010 | Morais et al. | |
| 7,664,669 B1 | 2/2010 | Adams et al. | |
| 7,664,816 B2 | 2/2010 | Heron et al. | |
| 7,724,532 B2 | 5/2010 | Zadesky et al. | |
| 7,748,634 B1 | 7/2010 | Zehr et al. | |
| 7,753,787 B2 | 7/2010 | Arche et al. | |
| 7,753,788 B2 | 7/2010 | Lum et al. | |
| 7,756,753 B1 | 7/2010 | McFarland | |
| 7,770,205 B2 | 8/2010 | Frank | |
| 7,775,884 B1 * | 8/2010 | McCauley | 463/39 |
| 7,800,592 B2 | 9/2010 | Kerr et al. | |
| 7,846,025 B2 | 12/2010 | Whitten et al. | |
| 8,016,677 B2 | 9/2011 | O'Kelley, II et al. | |
| 8,024,467 B2 | 9/2011 | Humphrey et al. | |
| 8,142,282 B2 | 3/2012 | Canessa et al. | |
| 8,241,129 B2 | 8/2012 | O'Kelley, II et al. | |
| 2001/0016519 A1 * | 8/2001 | Choe | 463/42 |
| 2004/0222970 A1 | 11/2004 | Martinez et al. | |
| 2005/0221895 A1 | 10/2005 | Lum et al. | |
| 2005/0245317 A1 * | 11/2005 | Arthur et al. | 463/42 |
| 2006/0154725 A1 | 7/2006 | Glaser et al. | |
| 2006/0287099 A1 | 12/2006 | Shaw et al. | |
| 2007/0260687 A1 * | 11/2007 | Rao et al. | 709/204 |
| 2007/0293319 A1 | 12/2007 | Stamper et al. | |
| 2008/0115121 A1 | 5/2008 | Douceur et al. | |
| 2008/0171600 A1 | 7/2008 | Ostergren et al. | |
| 2008/0242405 A1 | 10/2008 | Chen et al. | |
| 2008/0311997 A1 | 12/2008 | Goossen et al. | |
| 2008/0320190 A1 | 12/2008 | Lydon et al. | |
| 2009/0061840 A1 | 3/2009 | Fleischman et al. | |
| 2009/0111576 A1 | 4/2009 | Ostergren et al. | |
| 2009/0156127 A1 | 6/2009 | Zhu et al. | |
| 2009/0215497 A1 | 8/2009 | Louch | |
| 2009/0228842 A1 | 9/2009 | Westerman et al. | |
| 2009/0234472 A1 | 9/2009 | Pyle | |
| 2009/0253457 A1 | 10/2009 | Seguin | |
| 2009/0286549 A1 | 11/2009 | Canon et al. | |
| 2009/0325709 A1 | 12/2009 | Shi | |
| 2009/0325711 A1 | 12/2009 | Bronstein et al. | |
| 2010/0035640 A1 * | 2/2010 | Lew et al. | 455/466 |
| 2010/0088753 A1 * | 4/2010 | Ayres et al. | 726/9 |
| 2010/0099443 A1 * | 4/2010 | King et al. | 455/466 |
| 2010/0113148 A1 | 5/2010 | Haltovsky et al. | |
| 2010/0199228 A1 | 8/2010 | Latta et al. | |
| 2010/0222146 A1 | 9/2010 | Evans et al. | |
| 2011/0159959 A1 * | 6/2011 | Mallinson et al. | 463/37 |
| 2011/0314153 A1 * | 12/2011 | Bathiche et al. | 709/225 |

OTHER PUBLICATIONS

International Search Report for Application PCT/US2011/001760.

* cited by examiner

| MAY 2010 | | | | | | | 300 |
|---|---|---|---|---|---|---|---|
| S | M | T | W | T | F | S | |
| | | | | | | 1 | |
| 2 | 3 COD 1-2 INTER-CLAN | 4 | 5 HALO 8-9 INTRA-CLAN SEMI-OPEN | 6 | 7 | 8 | |
| 9 | 10 | 11 | 12 | 13 COD 8-9 | 14 | 15 | |
| 16 | 17 | 18 | 19 OPEN 8-9 INTRA-CLAN OPEN | 20 | 21 | 22 | |
| 23 | 24 | 25 | 26 OPEN 8-9 INTRA-CLAN CLOSED | 27 | 28 | 29 | |
| 30 | 31 | | | | | | |

Fig. 3

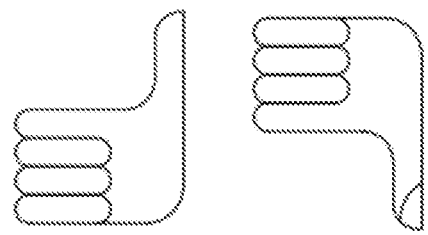
Fig. 15A
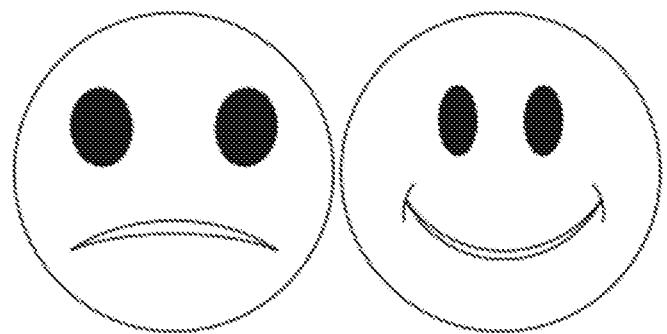
Fig. 15B
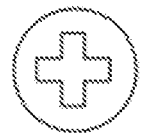
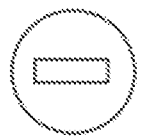
Fig. 15C

☑ YES
☐ NO
☐ MAYBE
Fig. 15G
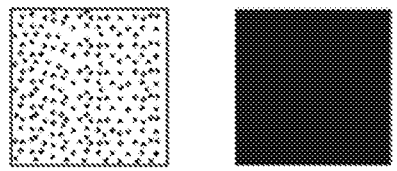
Fig. 15H
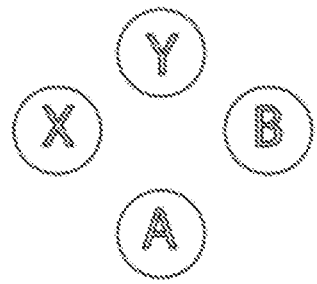
Fig. 15I

METHODS, DEVICES, AND SYSTEMS FOR VIDEO GAMING

BACKGROUND OF THE INVENTION

Multiplayer gaming has become very popular over the last 8 to 10 years, particularly since the introduction of the Microsoft® Xbox® and Xbox 360® game consoles, the Sony® Playstation 3® game console, and the Nintendo® WII® game console. By some accounts, the Xbox Live® gaming service associated with the Xbox® line of gaming consoles has over 20 million members worldwide. These members have a paid account with the Xbox Live® gaming service and select a gamer tag (and/or email address) and password that allows them to access features of the Xbox Live® gaming community by logging into the gaming service. The gaming service can be accessed using a computer (using an email address and password to log on) or via a game console.

The Xbox Live members can participate in a variety of activities using the Xbox Live® web service. For example, there is a currently a game marketplace for shopping for games, a video marketplace for streaming or downloading video content, and an avatar marketplace for shopping for avatar apparel that are accessible thru Xbox Live®. Content (e.g., games, game demos, videos, avatar apparel) can be purchased using Microsoft® Points, which are in turn purchased using a credit card. The content is then placed in a queue and can be downloaded to or accessed by a gaming console (associated with the member and his/her account) when the gaming console is next powered on by the member. Xbox Live® also has a simple web accessible community calendar where community game dates are posted, such as playing against a celebrity or Ladies Night. Interested gamers join the game by sending an invite or friend request to a gamer associated with the game night and logging into Xbox Live® via their game console to participate in the actual game.

The Xbox Live® gaming service is also accessible via a game console. Many of the features available thru web access of the gaming service are also available thru the game console access of the game service. In addition, a member can participate in multiplayer games and messaging activities with other members via the game console and Xbox Live® gaming service. A member can create a list of friends (other Xbox Live® members with whom a member likes to game) by sending and accepting friend requests with other members. When logged into the Xbox Live® gaming service, a member can see which friends are on-line, which game or other activity they are then engaged in, the gamer profiles of the friends, which games they've played, and more. Members can also send text and audio messages in real time to other members when logged into Xbox Live®. A member (or a party leader) can also start a party in Xbox Live® by inviting their friends or other members to join the party. A party is a way to talk to a group of friends at once, even if they're all playing different games. A member can join a party by accepting a party invite sent by a party leader. Also, the party (i.e., entire group of people invited to the party) can join a multiplayer game as group rather than inviting each member individually to the game. Members can exit parties voluntarily and parties are disbanded when all the members have signed out of Xbox Live, voluntarily left the party, or the game console is powered off. Alternatively, a multiplayer game can be established by one member sending a game invite to each member on a friends list that he or she desires to join the multiplayer game.

Clans and clan leaders are known in multiplayer gaming. A clan is a group of individuals who game together, similar to a party, but who may share a common gaming interest, such as a particular game or types of games. Some companies provide dedicated game servers for groups of gamers and their games. Some clans may be organized in web forums apart from the Xbox Live® game service and the multiplayer game. These forums can allow gamers to connect and form clans and exchange messages and post calendars so that members of the clan know when to log into a game service to participate in clan games, when clan games will be hosted, etc. At least one game, Halo® 3, has a clan feature built into the game that allows establishment of a semi-permanent clan on the Xbox Live® gaming service associated with that game. A member can create a clan in Halo® 3 by establishing a clan name (via an on-line keyboard), inviting members from a friends or players list by selecting their gamer tag, and sending a clan invite. Members can be added to the clan, messages sent to the clan, and members can leave the clan. Clan members are categorized into roles (e.g., Peon, Member, Staff, and Overlord), each of which have different rights within the clan. The Overlord, who has the most rights, can play in clan matches, recruit new members, broadcast clan messages, remove a clan member, and/or change the roles of the members.

While the party, multiplayer, and clan functions in the Xbox Live® and the web forums have improved the multiplayer gaming experience for millions of on-line gamers, there remains a need to further improve these functions and create new functions thereby enhancing the multiplayer gaming experience. Embedding a clan architecture in the gaming service in a way that allows its access to a wide variety of different multiplayer games from a variety of game publishers vie a game console would enhance the multiplayer experience. It would also be desirable to have a clan architecture embedded in a game service that permitted improved services between the clan members such as advanced messaging, calendaring, game selection, and game initiation for a gaming date as well as the ability for the clan leader to initiate a variety of actions on behalf of each member of clan within the game service. These features would be particularly useful for the casual gamers, who may have limited time and/or experience when it comes to multiplayer gaming. It would further be desirable to track clan data that could facilitate more pleasurable inter-clan gaming by matching gaming clans that are compatible (e.g., skill level, competitiveness, etc.), wherein the clan data may be tracked for specific games or generically irrespective of the game. In addition, it would also be desirable to provide improved options for providing unique game features and game prizes specific to clan gaming as well as providing a marketplace for clan related purchase, sale, and swapping of this clan specific (or other) content between clans. Still further, it would be desirable to provide improved connectivity between gamers logged into a game service and gamers who are not. It is believed that providing one or more of these features in an integrated architecture embedded in a gaming service that hosts multiplayer games across multiple gaming platforms (from a variety of publishers/developers) and gaming devices would further enhance the multiplayer gaming experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 3 is illustrates one embodiment of a clan calendar in accordance with the present invention;

FIGS. 15A-15D and 15F-15J are reply illustrations in accordance with the present invention.

DETAILED DESCRIPTION

Figure 1:
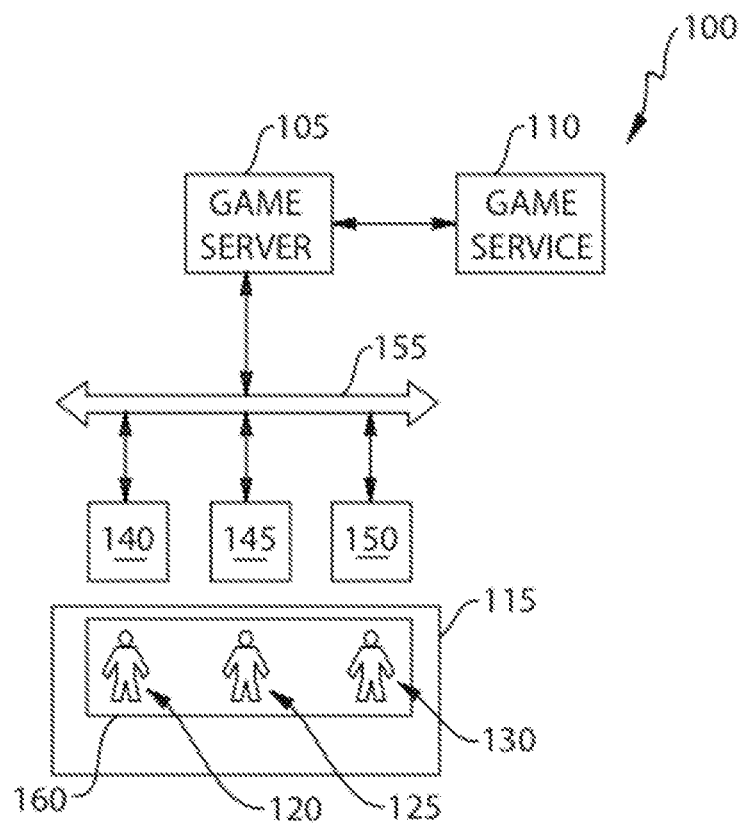
FIG. 1 illustrates is a schematic diagram of a game system suitable for use with the present invention.

The detailed description provided below in connection with the appended drawings is intended as a description of some examples of the present invention and is not intended to represent the only forms in which the present invention may be constructed, utilized or practiced. For example, specific details may be omitted, rearranged, or equivalent or other features or steps substituted as is known in the art. All publications referenced in the specification are hereby incorporated by reference.

As used herein, the terms "system," "network," and "server," are intended to refer to a one or more computer-related entities, either hardware, a combination of hardware and software, software, or software in execution. These entities may communicate via local and/or remote processes such as in accordance with a signal having one or more data packets (e.g., data from one component interacting with another component in a local system, distributed system, and/or across a network such as the Internet with other systems via the signal).

As used herein, the terms "component" and "application" refer to software or software in execution, wherein the software comprises a set of computer or machine readable/executable instructions or "code" stored on one or more computer readable mediums. For example, components and applications may be, but are not limited to being, one or more processes running on a processor, objects, executables, code, threads of execution, computer programs, and combinations thereof and may be localized on one computing device and/or distributed between two or more computing devices. Also, they can execute from various computer readable media having various data structures or instructions stored thereon. The set of instructions can be implemented in any programming or scripting language including, but not limited to, Microsoft Visual Basic®, Assembly, Java®, C, C++, Delphi®, Perl, and combinations thereof. Any data or information used, processed, or manipulated by a component, application, code or device herein can be stored in an array, lookup table, string or other structure as is known in the art. Pointers may be used to refer directly to another data value stored elsewhere in the computer memory using its address. A pointer references a location in memory. Pointers are also used to hold the addresses of entry points for called subroutines in procedural programming and for run-time linking to dynamic link libraries (DLLs). It will be understood that the various functionalities, data/information management, data/information storage, data/information processing, data/information transmission, and any other action implemented by or described in this specification with respect to a computing device (e.g., any server, game console, network, mobile phone, smart phone, smart tablet, game controller, headset, etc.) can be performed or implemented by computer readable instructions that are stored on one or more computer readable mediums, as is known in the art.

As used herein, the phrase "game play" refers to the live action displayed or controlled in a video game, including, but not limited to, one or more of manipulating a character or vehicle, interacting with a video game environment, interacting with an artificial intelligence (AI) character or object, interacting with a character or object representing another gamer, and providing inputs to a game controller to accomplish any of the foregoing. "Game play" can also include one or more of AI movement of characters or objects in a game environment as well graphical and/or audio rendering of the foregoing.

As used herein, the phrase "operating system" refers to one or more applications in a computing device that regulates the ways software programs use the computer hardware and the ways that users control the computer. Operating systems are found on almost any device that contains a computer with multiple programs—from mobile phones and video game consoles to servers.

As used herein, the phrase "computer readable medium" and the like may include both volatile and nonvolatile, removable and non-removable media implemented in any method or technology for storage of information such as computer readable instructions, data and data structures, applications or components or other information. Computer readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer.

The articles "a" and "an" should generally be construed to mean "one or more" unless specified otherwise or clear from context to be directed to a singular form.

The terms "gamer", "player", "member", or "user" generally refer to a human entity that plays, participates in, interacts with, or uses a computing device such as a game console, a smart phone, a smart tablet and a mobile phone. A gamer or player is a user of a computer-implemented video game via a computer-related communication infrastructure, computer-related systems, electronic devices, portable or otherwise, or any combination thereof. A variety of non-limiting examples of systems and devices that can be used by a gamer, player, member or user are described throughout the specification and comprise various combinations of game consoles, smart phones, mobile phones, cellular networks, networks, and servers.

The phrase "game service" refers to one or more components, applications, or code distributed across one or more servers or other computing devices that affords or enables, in a broad sense, playing a video game and engaging in any video gaming community related activities, such as messaging, over a communication network. The communication network can include wired and wireless local area and wide area networks, as well as access to a global positioning system. A game service typically resides on one more networked game servers. The game service allows users to play a game on multiple devices, such as a game console, a smart phone, or a smart tablet. Some other features that can be implemented in a game service are described in WO 2009/086221. Some examples of gaming services include Xbox Live!® by Microsoft, Inc®. and a service provided by Sony, Inc®. for the Playstation 3®. Other examples are described in U.S. Pat. Nos. 5,822,523, 6,226,686, 6,812,923, and 7,218,739.

The phrase "gaming community" refers to an affiliated collection of gamers that are associated with a game service. The gamers may become affiliated with the gaming community by payment of fee or mere registration without payment of a fee. An example is the Xbox Live® gaming community established by Microsoft, Inc®. Another example is the Playstation Network® established by Sony®.

The phrase "semi-permanent" refers to data or a functionality that exists after a multiplayer game terminates, after a gamer has logged out of gaming service, and/or after a game console is powered off. Once established, semi-permanent data or functionalities exist independent of the status of a multiplayer game or whether a gamer is logged into a gaming service. Semi-permanent data and functionalities may be accessible when a member of a gaming community first logs into a gaming service. Semi-permanent data and functionalities can be modified and deleted. One example of a semi-permanent functionality is a semi-permanent gaming clan.

The phrase "game console" refers to a special purpose interactive computer adapted for playing video games that can comprise one or more of a CPU, a network interface port, a video interface port, a system bus, an operating system, a memory controller for accessing a variety of types of memory, a 3D graphics processing unit and a video encoder for high speed, high resolution graphics processing. A video signal output from the game console can be transmitted to a separate display to display the video game. A console identification (ID) can be stored in ROM memory to identify the game console to game controllers when operating in a wireless mode via an RF module. A game console is typically connected to one or more game controllers via a wired or wireless interface. A game console is designed for consumers to buy and use for playing video games and other video or audio entertainment purposes (such as downloading and playing a movie, other video, audio, pictures, accessing the internet, etc.). A game console may have a hard drive or some other computer readable medium for storing a video game application downloaded from a disk or via a network connection. A game console is different from a general purpose computer which can perform or execute computer programs for a variety of other functions, such as word processing, video editing, accounting, spreadsheet development, etc. Many game consoles can be connected by a video cable, such as an HDMI cable, an S video cable, a component video cable, a fiber optic cable, and a DVI cable, to the separate display. Some examples of displays include a plasma television, an LED television, an LCD television, and a combination of a video projector and a screen. Some examples of game consoles include the Xbox® and Xbox 360® game consoles by Microsoft®, the Playstation 2® and Playstation 3® game consoles by Sony, Inc.®, and the WII® game console by Nintendo®. Some examples of an Xbox® brand game console are described in US 2005/0221895 and WO 2009/154831. The configuration of game consoles can be varied as is known in the art.

The phrase "game server" refers to a remotely run server which can be accessed by a plurality of game consoles to, at a minimum, play a variety of multiplayer video games. A game server is configured so that it is capable of receiving information/data from, and transmitting information/data to, a plurality of remote gaming devices. A game server may also be capable of communicating with other game servers. A game server is any combination of hardware and software designed to provide one or more of these services to the members of the gaming community. In one embodiment, a game server can be a dedicated server that comprises features making it suitable for high speed network services, including but not limited to fast CPUs, high performance RAM, a large data storage capacities, network hardware such as routers, modems and switches, and redundant power supplies and network connections. Other types of game servers may be used with the present invention as is known in the art. A game service may be supported by a plurality of networked game servers. In one embodiment, the game console, game server, and game service are all provided by a single company (or affiliated collection of companies) such as Microsoft® or Sony® in order to minimize compatibility issues between the game server, game service, and game console.

The term "clan" refers to a group of associated gamers that desire to frequently play one or more multiplayer video games as a group. Clan members may have a common affiliation or characteristic, such as gender, game skill level, or interest in a particular game. The frequency of game play can vary widely, from at least once a day to at least once a week to at least once a month. A clan represents just a portion of the gaming community affiliated with a game service, which can also contain millions of members many of whom may not be affiliated or associated with a clan.

The phrase "game publisher" refers to a company that publishes video games that it has either developed internally or has had developed by a video game developer. Some examples of video game publishers include Nintendo®, LucasArts®, Disney Interactive®, Warner Brothers Interactive®, Capcom®, Microsoft®, Sony Computer Entertainment®, Bethesda Softworks®, Ubisoft®, Activision®, and Take Two Interactive®.

The term "custodian" refers to a gamer who is the purchaser, owner, or a principal user of a particular game console. There can be more than one custodian of a game console.

The term "open" refers to a multiplayer video game involving one or more clans where non-clan members of the gaming community are permitted to temporarily join the clan for the multiplayer video game.

The term "closed" refers to a multiplayer video game involving one or more clans where non-clan members of the gaming community are not permitted to join the clan for the multiplayer video game.

The term "semi-open" refers to a multiplayer video game involving one or more clans where non-clan members of the gaming community are permitted to temporarily join the clan for the multiplayer video game if one or more predetermined criteria (e.g., skill level) associated with the non-clan member are satisfied.

The phrase "intra-clan game" refers to a multiplayer video game between clan members, which may further be open, closed or semi-open.

The phrase "inter-clan game" refers to a multiplayer video game between two or more clans. One or more of the clans can be open, closed, or semi-open for the multiplayer video game.

The phrase "gaming device" refers to any device that is registered with a gaming service and that is capable of participating in a multiplayer video game via the gaming service. Gaming devices include, but are not limited to, game consoles, smart phones, and smart tablets. The gaming device may or may not include a video screen for displaying video associated with the multiplayer game.

The phrase "smart device" refers to a smart phone, smart tablet, or any other mobile device providing similar functionality.

The phrase "smart phone" refers to any mobile phone capable of transmitting data to and receiving data from a cellular network. Smart phones have an operating system that provides a platform for development of applications that can be run on the smart phone. A smart phone can manage data, typically via keyboard, and can provide some functionalities that are more typically found on a personal computer. Some operating systems used on smart phones include Symbian® (including S60 series), iOS®, Palm® WebOS®, BlackBerry® OS, Samsung® bada phones running Linux, Binary Runtime Environment for Wireless, Windows Mobile®, Android® and Maemo®. WebOS®, Android® and Maemo® are built on top of Linux, and the iOS® is derived from the BSD and NeXTSTEP operating systems, which all are related to Unix. Smart phones can provide digital voice service as well as any combination of text messaging, e-mail, Web browsing, still camera, video camera, MP3 player, video player, television and organizer. Smart phones can be provided in a variety of shapes and sizes. Some examples of smart phones suitable for use in the present invention are described in U.S. Pat. Nos. 7,515,431, 7,724,532, and 7,649,744. Some examples of cellular networks suitable for use with the present invention are described in U.S. Pat. Nos. 5,771,455 and 7,606,555. The smart phone may have an IP address assigned to it that is associated with a cellular base station that is in communication with the smart phone. Data transmitted by the smart phone to a cellular network may be converted to Internet Protocol (IP) data packets for transmission to a server, such as a game server.

The phrase "smart tablet" refers to a mobile device that falls between smartphones and netbooks, delivering one or more features typically found in smartphones (e.g., data management, 3G connectivity, GPS) in a slightly larger device with a keyboard.

The phrases "video game" and "multiplayer video game" refer to an electronic game that involves interaction between a user and a user interface (e.g., a game controller) to generate visual game related feedback on a display. A multiplayer game is a video game that can be played simultaneously (either cooperatively or competitively) with a plurality of players. A single player video game is a video game that is played by a single player. A video game application can include both a single player and a multiplayer video game. Video games that can be utilized with the present invention are quite varied and can include simulation, action, adventure, action-adventure, role-playing shooter, strategy, and so forth. The video game can be graphic intensive (such as Halo 2®, Red Dead Redemption®; Call of Duty Modern Warfare 2®; Grand Theft Auto®; etc.) and/or text intensive. The video game may be downloaded from a disk onto a gaming device or downloaded to a gaming device from a server. The video game may be implemented by a game application or component comprising a set of computer readable instructions using any one of a variety of programming or scripting languages, such as Microsoft® Visual Basic, Assembly, Java®, Smalltalk, C, C++, Delphi®, Perl, and combinations thereof. The set of instructions can include APIs and/or libraries, which can handle sound processing, input, graphics rendering, and artificial intelligence tasks such as pathfinding. The video game application can be executed by a single computing device, such as a game console, or distributed across a plurality of computing devices, such as one or more game servers and a game console, and executed by the plurality of computing devices, wherein each computing device executes a different portion of the video game application.

Referring now to FIG. 1, one example of a multiplayer gaming system 100 comprising a game server 105 for hosting a game service 110 for a community of gamers 115 is illustrated. The community of gamers 115 may comprises greater than 100,000; greater than 500,000; greater than 1,000,000; greater than 10,000,000; greater than 25,000,000; greater than 50,000,000; greater than 100,000,000; or greater than 200,000,000 members. The gaming community may comprise less than 500,000,000; less than 250,000,000, less than 150,000,000, or less than 50,000,000 members. For purposes of illustration, the community of gamers 115 comprises a first gamer 120, a second gamer 125, and a third gamer 130. A first game console 140, a second game console, 145, and a third game console 150 are registered with the gaming service 110. In one embodiment, the first gamer 120 is the custodian of the first game console 140, the second gamer 125 is the custodian of the second game console 145, and the third gamer is the custodian of the third game console 150. The first, second, and third game consoles are typically located at remote locations from each other (e.g., different buildings, different cities, different states, or different countries). The first, second, and third game consoles 140, 145, and 150 are connected to the game server 105 by a communication network 155.

The communication network 155 can comprise a wired local area or wide area network, such as a fiber optic network, a twisted-pair network, a T1/E1 line-based network or other links of the T-carrier/E carrier protocol, or a wireless local area or wide area network (operating through multiple protocols such as ultra-mobile band (UMB), long term evolution (LTE), etc.). The Internet is a common communication network by which the gaming devices can communicate with the game service 110. Additionally, communication network 155 can comprise base stations for wireless communications, which include transceivers, associated electronic devices for modulation/demodulation, and switches and ports to connect to a backbone network for backhaul communication such as in the case of packet-switched communications.

Figure 2:
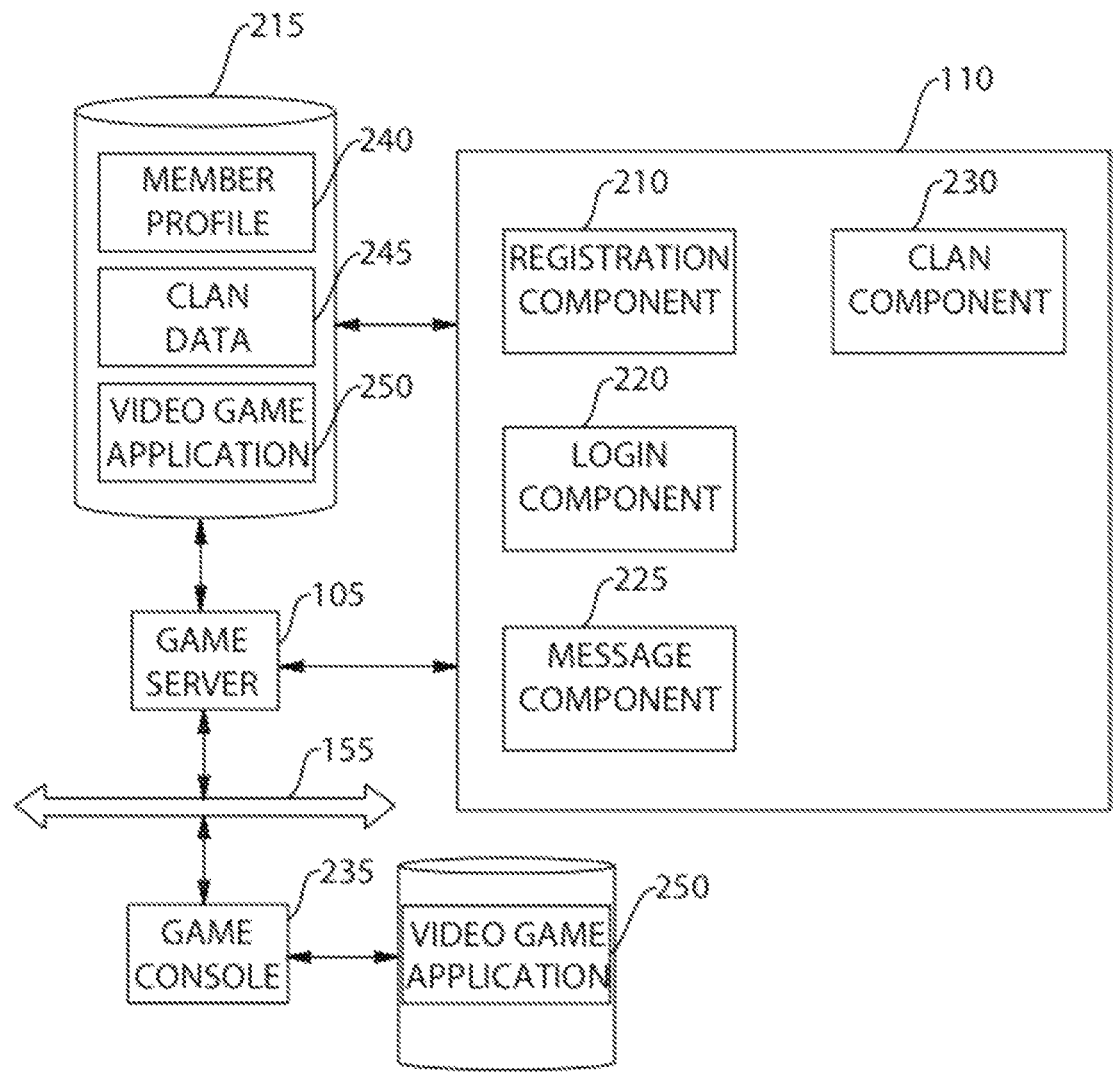
FIG. 2 is a schematic diagram of the game system of FIG. 1, further illustrating various components.

Referring to FIG. 2, one example of the game service 110 will now be described in greater detail. The game service 110 provides a service-based, connected gaming experience among multiple members of the gaming community 115 and their gaming devices registered with the gaming service 110. Game service 110 utilizes various components implemented by a set of computer readable instructions to deliver the connected gaming experience by, in part, transferring multiplayer game play data between the game consoles. The game service 110 can be distributed between one or more interconnected game servers. A registration component 210 registers first-time members of the gaming community 115 and their gaming devices, such as the first, second, and third game consoles. Other gaming devices may also be registered with the game service 110. At the time registration, a member selects a gamer tag and password associated therewith that is used to identify the member within the gaming community. An email address and phone number may also be registered and associated with the gamer tag. The gamer tag, email address, and phone number are referred to herein individually as personally identifiable information. This information is stored by the at least one game server on one or more computer readable mediums such as database 215 that is accessible to the game service 110. A single game server 105 can comprise a plurality of computer readable mediums for storing data or information. The database 215 may be associated with the same game server 105 or may be distributed on a different server or a collection of different servers.

The game service 110 may also include a login component 220. The login component 220 is used to authenticate or validate a member of the gaming community upon connection to the game service 110 when the game console 235 is powered on. The member is authenticated via login data, such as a gamer tag and password that is transmitted by the game console 235 to the gamer server 110. The gamer tag and password can be compared to the gamer tags and passwords for members of the gaming community stored on the database 215. The gamer tag and password are authenticated or validated if a match is found. Login data can comprise any data that uniquely identifies the member and/or game console. For example, when a member connects with game service 110, the login component 215 may prompt the member for a gamer tag and a password. Alternatively, the gamer tag and password may be automatically transmitted by the game console 235 to the login component 220 when the game console 235 is powered on thereby automatically connecting the member to the game service 110. The login component 220 may also obtain a game device identifier that uniquely identifies the game device that the member is using and a network path to the gaming service 110. The gamer tag and password, or other personally identifiable information, transmitted to the login component 220 by the game console 235 are then authenticated. Assuming proper authentication, the member gains access to his or her member profile 240 stored with the game service 110, and the game device identifier and the network path for the member's gaming session are stored in the member profile so that messages and information may be sent to the game device.

The member profile can comprise the personally identifiable information and/or other descriptive information about the member such as for example where a user lives and the time zone thereof, age, gender, native language, a listing of games available for play (either purchased or downloaded), etc. This information is available to a user upon logging into gaming service 110 as described above. The member profile can also include additional information about the member such as game records/statistics and a friends list. Game records can comprise statistics for a particular game, rewards acquired for a particular game and/or other game specific information as desired. As the member participates in the video games, the game statistics may be updated to reflect the member's progress within the game. A friends list is a listing of friends of the member that are also members of the gaming community 115. Friends may be added to/removed from friends list when using game service 110. Portions of a member's profile may also be maintained locally on a game device. In such instance, the locally stored profile may be synchronized periodically with the member profile stored in the database 215. A further description of friends and friend's lists is set forth in US 2009/0111576.

The game service 110 can also include message component 225, which permits the game device, such as a game console, to send a message to another game device (or mobile phone) such as another game console via the network 155. Messages may be sent from, and received by, any game device, when the game device is connected to game service 110. The message component routes the messages between the game devices in part by tracking the network addresses of the game devices. Messages can include text messages, voice messages, and specialized invite text messages. Game invites allow a member playing a game on one game device to invite one or more members on another game device to play in the same game while using network and/or game service 110 to pass gaming data between the two game devices so that the two members are playing from the same session of the video game. The friends list can also be used in conjunction with message component 225.

In accordance with one aspect of the present invention and with further reference to FIG. 2, various methodologies and devices for use with the game system 100 will now be described. The game service 110 further comprises a clan component 230. The clan component 230 permits a plurality of members of the gaming community 115 to form one or more semi-permanent clans, each having a clan leader. The clan has clan data 245 associated therewith that may be stored on/in one or more computer readable mediums associated with the game server 105 and/or one or more game devices, such as the first game console 140. The clan data 245 is accessible by one or more video game applications 250 on one more game consoles. The video game application 250 can reside on a computer readable medium 250 of the game console 235. In another embodiment, the video game application 250 resides on the database 215. In one embodiment and for purposes of illustration, the first, second, and third gamers are also members of a gaming clan 160, wherein one of the first, second, and third gamers is a clan leader for the gaming clan 160. In one embodiment, the first gamer 120 is also the clan leader.

The clan data 245 can comprise a wide variety of data/information about the clan and/or one or more members of the clan. The game server and/or game console can comprise computer readable instructions for storing the clan data 245 on the database 215 or other computer readable medium and for providing accessibility to the clan data by a plurality of the game consoles (and video game applications disposed thereon) associated with the members of the clan. The game server can also comprise computer readable instructions for transmitting the clan data to a plurality of game consoles and/or a plurality of smart phones, wherein the game consoles and smart phones are each associated with a member of the gaming clan. Similarly, the game consoles can comprise computer readable instructions for transmitting the clan data 245 from a game console to a game server. The clan data 245 may also be associated with the member profile of each member of a gaming clan such that accessing a member profile provides accessibility to the clan data. Accessibility and transmissibility of the clan data between the game consoles, game servers, and smart phones provides for easy updating of the clan data between devices as the data changes.

The clan data 245 can comprise a gamer tag for each member of the semi-permanent gaming clan, a telephone number for each member of the semi-permanent gaming clan, an email address for each member of the semi-permanent gaming clan, a clan identifier, one or more clan classes, a time zone for each member of the semi-permanent gaming clan, the native language for each member of the semi-permanent gaming clan, a list of clan games common to each member of the semi-permanent gaming clan, a list of game maps common to each member of the semi-permanent gaming clan, a list of opposing clans, a multiplayer clan game prize, game content for a first video game application and a second video game application, and combinations thereof.

The clan name may be provided to the game service 110 by the clan leader. Personally identifiable information of one or more members of the clan, such as an email address or telephone number for sending text and/or audio messages, may also form part of the clan data 245.

Clans may be characterized by one or more clan classes, wherein the class is defined by a characteristic. Clan classes can be used by the game service 110 and/or a game console 235 (and likewise the video game application 250) for pairing clans against each other in clan-to-clan multiplayer video games; matching individual, non-clan members of the gaming community 115 to a clan in an open or semi-open clan game; and assisting, individual, non-clan members in a search for a clan to join. The clan class can be determined by computer implemented algorithms associated with the clan component 230, or assigned by the clan leader, or a combination thereof. The algorithms may analyze personally identifiable data associated with each member of the clan and assign a clan class based on a representative characteristic shared by the members of the clan. Representative characteristics can include a representative gamer age, a clan skill level, a representative time zone, a representative native language, and a representative gender. In some embodiments, the value of the representative characteristic may be based on what the majority, or the largest percentage or some other statistical value (e.g., median or mean), of clan members have as an individual value for the characteristic (which may be stored as personally identifiable data in a member profile). For instance, the representative gender can be selected based upon whether the majority of clan members are male or female. The representative time zone can be based upon the time zone in which the largest percentage of clan members resides. The representative native language can be based upon the native language associated with the largest percentage of clan members. The representative age can be selected based upon the median or mean age of the clan members or a weighted average of the age distribution of the members of the clan. Some representative age ranges that might be used are 10 to 20 yo, 20 to 30 yo, 30 to 45 yo, and older than 45 years of age. A clan class may also be established according to the types of games the clan typically plays (e.g., first person shooters, flight simulators, etc.) or a particular game, such as Red Dead Redemption®, or game franchise, such as Call of Duty Modern Warfare®.

The clan skill level can be based upon a classification (e.g., easy, medium, or hard) individually assigned to the largest percentage of clan members or the clan skill level can be assigned by the clan leader. In one embodiment, there can be between 3 and 6 clan skill levels. The clan component can comprise computer readable instructions for periodically validating the clan skill level. For example, the instructions can determine the number of video game wins by the gaming clan and the total number of matches by the gaming clan against other clans having a same or similar clan skill level. A score can be assigned to the clan skill level (e.g., 1-5) indicative of whether the clan skill level is representative of the gaming skill of the clan. The score can be a function of the ratio of the video game wins to the total number of matches, wherein the clan skill level is validated when the ratio is between about 40% and about 60%. For example, a score of 5 representing a validated skill level could be assigned if the ratio is between about 40% and about 60% and a score of 0, representing no validation, could be assigned if the ratio is between 0% and 10% or 90% and 100%. In one embodiment, a set of computer readable instructions associated with a game server can receive login data from a plurality of game consoles, wherein the login data comprises a clan identifier and a clan skill level. The instructions can search the login data for clans having the same or similar skill levels that are logged into the game service and which can be paired against each other in a multiplayer video game.

The clan data 245 can also include a list or log of each multiplayer game of each clan member that is validly registered with the game service 110. A subset of the list may be maintained by the clan component 230 that tracks the multiplayer games that are common between all the members of the clan. For example, a set of computer readable instructions on the game server can identify, compile, and store a list of multiplayer video games and/or game maps associated therewith that are common between a plurality of gamers of the gaming community and, in one embodiment, are common between the members of a gaming clan. A validly registered game is a game that has not expired or, in the case of games distributed by disk, not sold or otherwise disposed of by the purchaser. Games may be validly registered with the game service by a serial number or other identifier. Games that have not been played by a clan member within predefined period, e.g., such as 2, 4, 6, 8, or 12 months, may be automatically removed from the list by the clan component 230. The list may also include a listing of maps or other game content downloaded by a clan member for one or more of the multiplayer games. Common maps and content among the members of the clan may also be tracked.

The clan data 245 can also include other game data. For example, a multiplayer game may have game content that is only available for clans (v. an individual or single player of the video game), such as a clan skin, a clan weapon, a clan skill, or clan game map. This unique clan content can be stored as clan data with the game service 110 and/or a game device and unlocked for use as described herein. One or more video game applications, which may reside on a computer readable medium of the game console, or the game service 110, can comprise computer readable instructions for implementing or executing the use of this multiplayer clan data in the game play of a video game.

Still further clan data 245 can include generic clan game data, such as points accumulated collectively by the clan in clan matches. Clan data may include an opposing clan list, wherein the clan list comprises the clan identifiers (e.g., clan names) for opposing clans that play against the clan from time-to-time in one or more multiplayer games. Clan data may also include data generic to the clan, such as a clan avatar and data associated with a virtual currency account associated with the clan.

A clan can be created by a variety of methods. In one embodiment, a member of the gaming community 115 can create a semi-permanent clan by logging into the gamer service 110 and using the clan component 230 to create a clan name and assigning one or more clan classes and other clan data to the clan. A set of computer readable instructions on the game console may enable the semi-permanent clan leader to then send a clan invite to friends on his or her friend list inviting them to join the clan, wherein the clan invite is transmitted to the game server and then to the game consoles of the friends. A set of computer readable instructions associated with the game server then enables receipt of and transmission of the clan invite to a second game console across the network 155. The friends can be selected by the clan leader using personally identifiable data, such as a gamer tag. The clan invite can be either accepted or rejected by the friend when he or she is logged into the gaming service 110. Acceptance of the clan invite thereby associates that member semi-permanently with the clan. The clan invite can include the clan name and the clan classes assigned to the clan by the clan leader. Alternatively, in another embodiment, a member of the gaming community 115 can access the clan component 230 and select the clan name created by the clan leader from among a plurality of clan names. Selection of the clan name thereby associates the member with the clan. A plurality of members of the gaming community 115 can be associated with the clan using these methods, which can be implemented by computer readable instructions associated with the game console and/or the game server.

As discussed more fully hereafter, the clan leader, by virtue of the clan structure, may be automatically authorized to take certain actions within the game service 110 and multiplayer games on behalf of each member of the clan. Some of these actions can include, but are not limited to, conducting transactions (e.g., purchasing, selling, swapping) in the clan marketplace, administering a clan calendar, initiating intra and inter clan game matches, and administering (e.g., inputting, modifying, deleting) clan data. The clan component 230 may automatically rotate the clan leader designation between clan members according to a pre-determined schedule. For instance, a different clan member may become the clan leader every 2, 4, or 6 months. These functions can be implemented by computer readable instructions associated with game server and/or the game console.

Referring to FIGS. 2 to 6 and in accordance with another aspect of the present invention, methods, devices and systems for implementing a clan calendar will now be described. The clan component 230 may be utilized to maintain a clan calendar 300, set clan game dates and times, and send and receive messages from the members of the clan regarding the clan calendar or clan multiplayer gaming. Clan multiplayer game sessions may be categorized as unscheduled and scheduled. The clan component 230 can provide functionality for managing scheduled and unscheduled game sessions. Predetermined dates on which scheduled clan game sessions occur are referred to herein as clan game dates. A clan game date will typically have a proposed game start time and end time. The game start times and end times can be adjusted to reflect the various time zones of the clan members so that, when a clan member accesses the clan calendar, the clan member is viewing the correct time for his or her time zone.

A scheduled clan game session is one that has been selected in advance by the clan leader and stored in a clan calendar. One example of a visual representation of a clan calendar is shown in FIG. 3. The data (collectively "clan calendar data") associated with the calendar may be stored in an array or table on a computer readable medium associated with a game server, a game console, or a smart device. Data associated with a specific game date is referred to as game date data. Game date data can include, but is not limited to, start/end times for the game date, the name of the opposing clan if one, the nature of game participation (e.g., open, closed, semi-open, inter-clan, intra-clan, etc.), and the game title. The scheduled clan game sessions can occur with regular or irregular frequency. For example, regularly scheduled game sessions might be scheduled to occur on a specific day of each week (e.g., every Friday at 8:00 PM EST). Alternatively, the game sessions might be scheduled to occur on a specific day/week of each month (e.g., the second Friday of each month). The clan leader can enter these game dates and times into the clan game calendar via the clan component 230 from a game console or smart device, such as a smart phone or tablet. Scheduled game dates can also be categorized by a clan class, a game title, or whether the game session is an intra or inter-clan, open, closed or semi-closed. If the game session is inter-clan and the opposing clan has been selected, then the opposing clan name may also stored as clan calendar data. For example, one game date might be assigned for the Call of Duty® video game while another game date might be assigned for a Halo® video game. Clan calendar data, which includes game date data, can also comprise visual data associated with the visual appearance of the clan calendar. Other data may also be assigned to game dates and viewable in the clan calendar 300. The clan calendar 300, as an example, has game dates established for May $3^{rd}$, May $5^{th}$ May $12^{th}$, May $19^{th}$, and May $26^{th}$ of 2010. Halo® and Call of Duty® (COD) are two games that have been selected. Two of the game dates are open (meaning no game has been selected).

Figure 4:
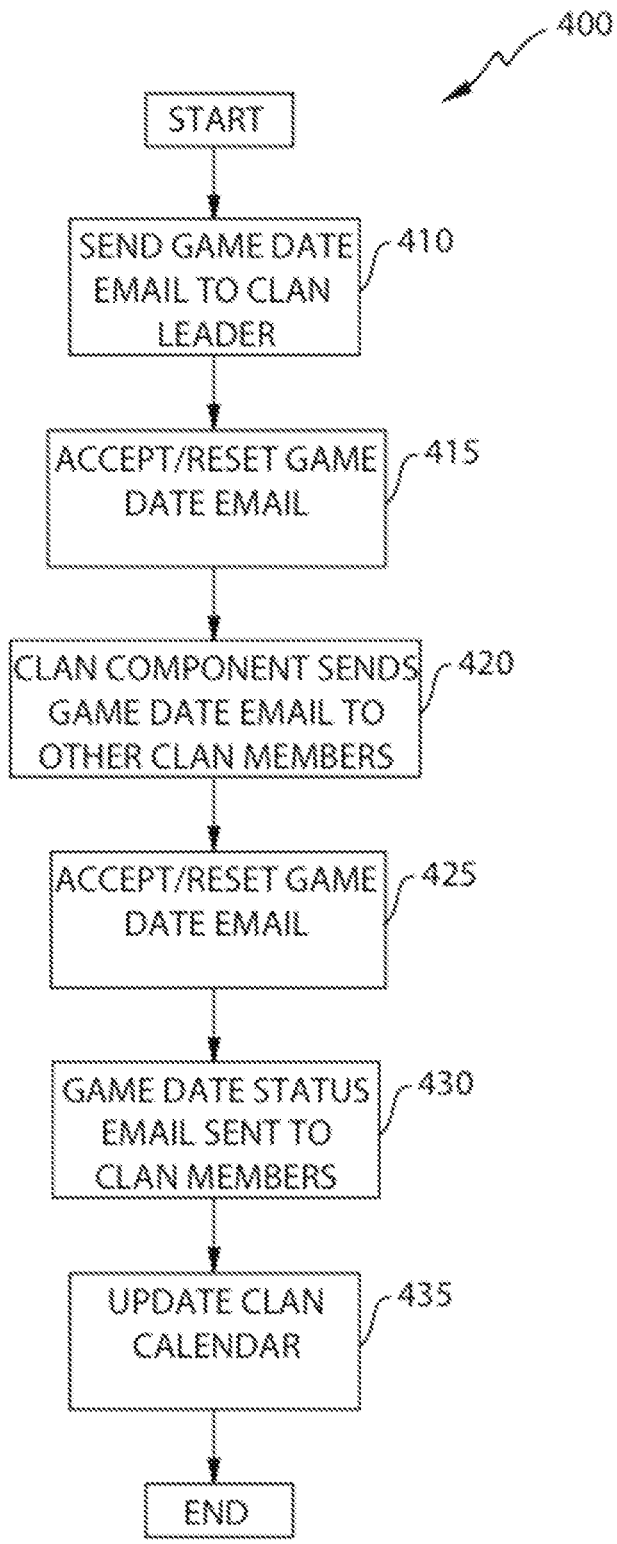
FIG. 4 is a flow diagram for messaging associated with the clan calendar of FIG. 3.

One embodiment of a messaging system for use with scheduled clan game dates of the clan calendar 300 will now be described with reference to FIGS. 4 to 6 and method 400. As previously described, the clan leader may enter one or more game dates into the clan calendar 300 via the clan component 230. This can be accomplished by logging into the game service, as previously described herein, from a game console or smart device. The game server can then transmit clan calendar data to the game console or smart device so that the clan calendar can then be displayed (with or without game dates entered) by a display connected to the game console or smart device. The clan leader, or other clan member, can then provide inputs to the game console or smart phone to enter, modify, or delete game date data.

As the game date draws near, the clan component 230 may automatically generate an email or text message 500 to the clan leader using the email address and phone number stored as personally identifiable data in the member profile or the clan data on a computer readable medium associated with the game server, as shown in block 410. Alternatively, the clan leader can login to the game service 110 from a game console or smart device (e.g., smart phone or smart tablet) to access, display, and accept or reject a game date of the clan calendar 300 on the game console or smart device in place of the automatic email generation now described. The game date email 500 sent to the clan leader sets forth the game date data previously entered into the game calendar 300 that is associated with the game date. If the clan leader approves of the game date data and plans to participate on the game date, then he or she merely replies to the game service 110 from the smart device by accepting the game date (meaning the clan leader confirms that he/she will participate on the game date according to what has been entered into the game calendar). If the clan leader is unavailable for the game date, the clan leader can designate a temporary alternate clan leader to manage the game date (or this default may be stored as clan data). Alternatively, the clan leader can reject the game date, thereby indicating that the clan leader will not be joining the game date. The acceptance or rejection of the game date can be transmitted from the smart phone or game console to the game server via one or more networks (cellular and/or Internet).

In the event the game date was designated as open, the game date email 500 sent to the clan leader can contain additional information stored as clan data or otherwise gathered by the clan component 230. The email can contain the list of games and/or maps that are common among all the members of the clan. Alternatively, a listing of all games owned by each clan member may also be included irrespective of whether the game is common to every clan member. In addition, statistics regarding individual clan member use of the common video games may be included, such as the number of hours and/or percentage of time the clan member has played each video game since the last game date (or some other time period designated by the clan leader), the amount of time each member has spent playing either a single player or multiplayer version of each video game, etc. This information can be useful for the clan leader when selecting a game for an open game date. For instance, this information can enable the clan leader to choose the video game that is currently most popular with the clan members. The popularity of some games may fade over time and some may be long term favorites. In addition, video games that fade over time can become popular again once there has been a sufficient break in the game play. This data can improve game selection by a clan leader when there are multiple competing games available for multiplayer play by the clan. The data may also include historical data (for a period of time selected by the clan leader) for past game dates (such as games/maps played), so that the clan leader can select video games that may not have been played in a while in order to keep the game dates interesting. In addition, when a game date ends, the clan members can be prompted to provide feedback (perhaps when signing out of the video game or otherwise terminating execution of the video game application) as to whether the clan member enjoyed the game date (e.g., enjoyed the game played, enjoyed the level of participation, etc.). This data can be compiled by the clan component 230 and provided in the game date email sent to the clan leader to further aid the clan leader in selecting games and participation levels that are most favored by one or more members of the clan. The video game can be selected by the clan leader in the game date email using a radio button or other method known in the art.

The clan component 230 can employ computer implemented statistical algorithms to analyze the historical data to provide a recommended video game for the game date. The recommended video game may be selected from among the games that are common to all the members of the clan. For example, a game which a majority of clan members have played during the prior thirty days, or having the most cumulative game time, or having a majority of favorable feedback from the last game date associated with the game (or combinations thereof) could be used as criteria for a game recommendation by the clan component 230. The clan component 230 can apply other filters, criteria, and statistical analysis to this data to arrive at a recommended game.

Figure 5:
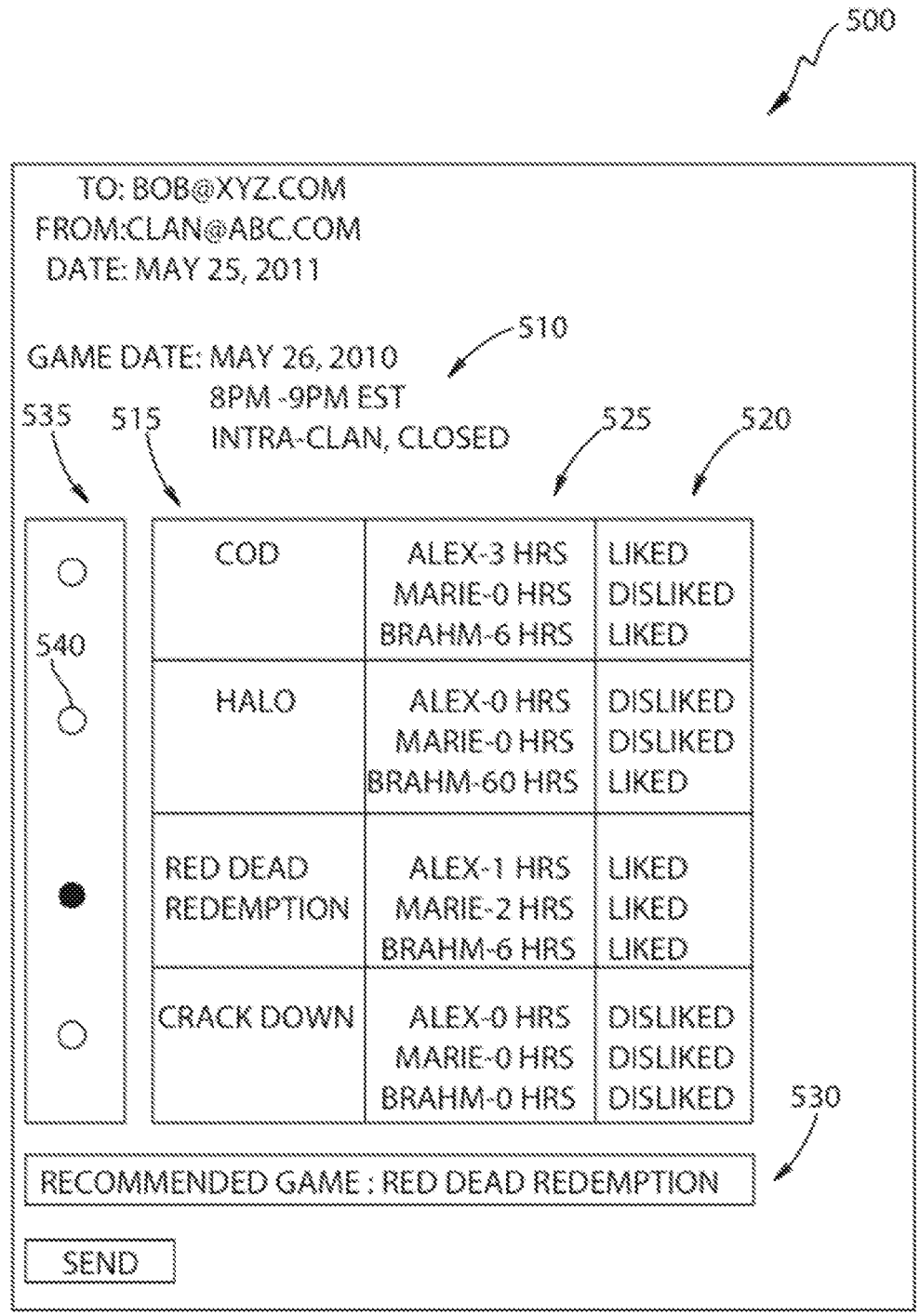
FIG. 5 illustrates one embodiment of a game date email associated with the clan calendar of FIG. 3.
Figure 6:
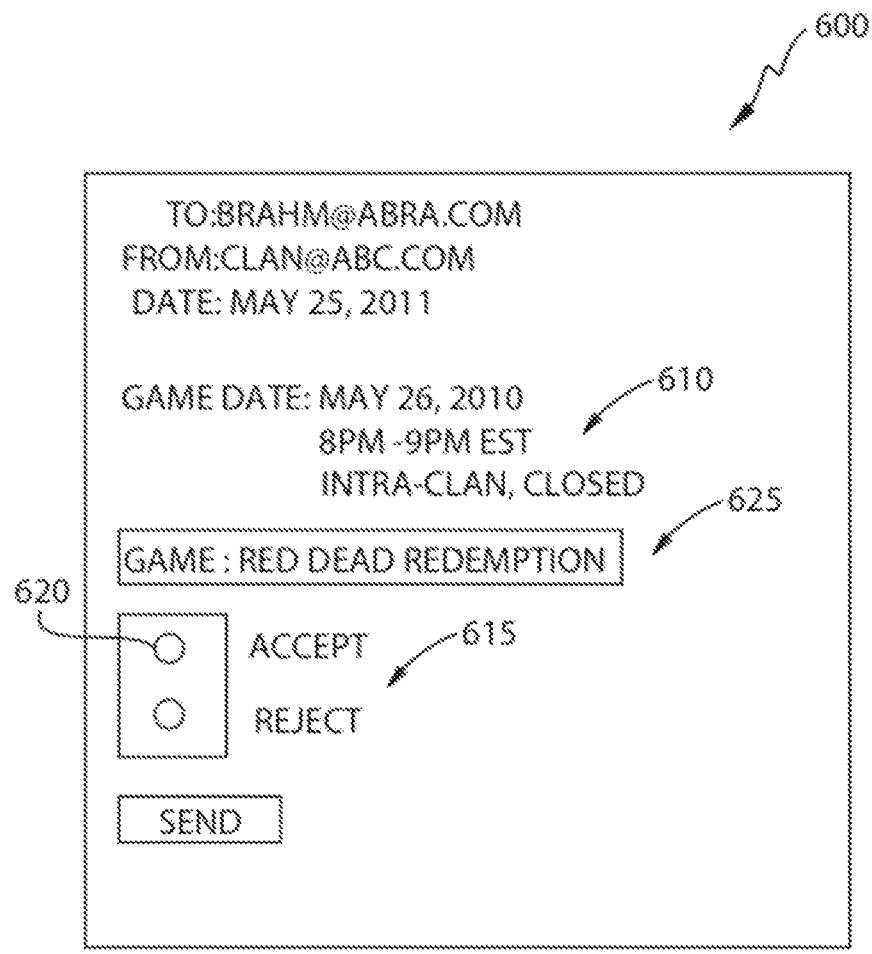
FIG. 6 illustrates another embodiment of a game date email associated with the clan calendar of FIG. 3.

An example of a game date email, as displayed on a smart phone or other device, to a clan leader is shown in FIG. 5. Game date email 500 represents only one arrangement for a game date email to a clan leader. The game date email 500 comprises a game date field 510, a game list field 515, a feedback data field 520, a game statistics field 525, a game recommendation field 530, and a game selection field 535. The game date field 510 comprises game date data, such as the game date, start and end time, game to be played (or in the case of email 500, open), and the participation level (in the case of email 500, it's an intra-clan game that this closed). Other game date data may be included or substituted. The game list field 515 comprises a listing of multiplayer games and/or maps. The listing can comprise multiplayer video games and/or maps commonly available to each member of the clan or a complete listing of all games and/or maps owned by each of the clan members. The feedback data field 520 comprises historical data compiled by the clan component 230 from one or more past game dates for one or more of the games listed in the game list field 515. As previously discussed, this data can be compiled by the clan component 230 from the feedback from one or more clan members at the termination of or otherwise following a game date. Other historical data may be included or substituted. The game statistics field 225 comprises historical statistical data for the games and/or maps listed the game list field 515. As previously discussed, the statistical data can comprise the number of hours a game has been played within a predefined period of time, the percentage of time a game has been played within a predefined period of time, etc. Other game statistical data can be included or substituted. The game recommendation field 530 comprises a video game title recommended by the clan component 230 for the game date based upon an analysis of historical data and the feedback data. The game selection field 535 comprises a selection mechanism, such as radio buttons 540, for selecting one of the games in the game list field 515 for the game date. Other mechanisms for inputting the selection of a video game to a smart phone or other device can be employed as is known in the art. While these fields are shown in the context of the email 500, it will be appreciated that these fields may be viewable in other contexts by a clan leader. For example, one or more of these fields may be displayed by a display connected to a game console when the game console is logged into the game service 110.

After the game server receives a reply from the clan leader to the game date email, the clan component 230 then sends a game date email to each of the other members of the clan, as described in block 420 of process 400. An example of a game date email 600 (displayed on a smart phone or other device) to the other clan members is shown in FIG. 6. The game date email to the other clan members contains the game date, game start and end times, the game to be played, and the participation level (alternatively, members of the clan can login into the game service 110 to access this information and accept or reject the game date directly via the game service 110). The historical data previously described may also be included in the email and/or accessed via the clan component 230 by each member of the clan from their respective game console or smart device. Each clan member then replies to the game date email by either accepting or rejecting it, meaning the clan member plans to participate or not participate in the game date. The game date email 600 comprises a game date field 610, an acceptance field 615, and a game field 625. The game field 625 describes the game to be played on the game date. The acceptance filed 615 can comprise an acceptance mechanism, such as radio buttons 620, for accepting or rejecting the game date. Other mechanisms for accepting or rejecting the game date can be employed as inputs to the smart phone, as is known in the art. While these fields are shown in the context of the email 600, it will be appreciated that these fields may be viewable in other contexts by the members of the clan. For example, one or more of these fields may be displayed by a display connected to a game console when the game console is logged into the game service 110.

The clan component 230 then compiles a list of acceptances and rejections and distributes a game date status email (or other message/text message) to one or more of the game consoles and smart devices associated with each of the member of the clan. If the acceptance rate is low for the game date (this threshold can be set by the clan and stored as clan data), then the game date status email can notify the clan members that the game date is canceled. If the acceptance rate is satisfactory, then the game date status email can notify the clan members that the game date is confirmed and provide a list of who (by gamer tag) will be participating (i.e., who accepted the game date email) in the game date and/or a list those clan members who declined the game date and/or a list of those clan members who failed to respond.

Variations of this methodology can be employed. For example, the game date email can contain the list of games/maps that are common among the clan members and each member can vote for one or more choices for the game date. Clan members could choose their top 3 games and participation levels. The clan component 230 can analyze this data and provide the best game/participation match from among the returned responses. For instance, a computer implemented algorithm might take weighted valuations among the returned rankings (e.g., first choice weighted higher than second choice, etc.) in arriving at the best match of game and/or participation level for the game date. In this way, a majority of the clan members may be kept engaged in the game dates and the existence of the clan may be maintained. The clan calendar 300 may be synched with conventional calendar programs of the clan members stored on their respective smart devices or game console, such as Microsoft Outlook®, so that game dates are placed on their personal calendars. In addition, vacations and other commitments of individual members may be synched generically (showing as merely blocked without details) on the clan calendar 300 to help facilitate selection of game dates by the clan leader. This data can be transmitted between the smart devices/game consoles and the game server and stored on computer readable mediums associated with each. For example, the game date could include data indicating whether the date and time are blocked for one or more clan members. Proposed game dates can also be identified by the clan component 230 by examining open dates and using filters established by each member of the clan for when they are available for game dates. For example, one clan member might set a filter that would permit game dates only on weekends between specified times.

Game dates against another clan or opposing clan can also be facilitated using the clan component 230. This can be an automated, semi-automated, or manual process. For example, the clan component 230 can search the clan data for clans having the same clan classes and/or their clan calendars for the same game date/times and automatically pair the clans for the game date. In another embodiment, the clan component 230 can suggest to each clan leader the pairing of the clans for the game date (or other game date), wherein the pairing can be accepted or rejected by the clan leaders (a semi-automatic process). The suggestion can be transmitted to one or more of the smart device and game console associated with the clan leader. In another embodiment, the clan leader can view the clan calendar for a clan on the clan list and suggest a pairing to the other clan leader for the game date (a manual process, although emails between the clan leaders can be facilitated by the clan component 230). In still another embodiment, the clan component can search the game service for opposing clans that are on an opposing clan list for a first clan and who are logged into the game service. The clan component can then transmit to a game console a list of the opposing clans on the opposing clan list that are logged into the game service. If game play for a video game is against an opposing clan, the game server can comprise computer readable instructions for transmitting game play data for the video game between a plurality of game consoles associated with members of a first clan and a plurality of game consoles associated with members of a second clan, wherein all the game consoles are logged into the game service.

In accordance with yet another aspect of the present invention, methods, systems and devices for communicating between a game console, a game server, and a mobile phone will now be described. One of many uses for this functionality is to manage unscheduled game sessions, which will now be described with reference to FIGS. 7 and 8. Process 700 begins with a plurality of clan members who login to the game service 110 from a plurality of game consoles to play a multiplayer video game, as shown at blocks 710 and 715. An unscheduled clan game session may occur when a threshold number of clan members are logged into the game service 110 and are engaged in playing the same multiplayer video game (or perhaps playing the single player version of the game) at the same time. The threshold number of players may be set by the clan leader and stored as clan data 245. If the plurality of clan members participate in the same multiplayer video game, as described at block 715, and the clan component 230 determines that the threshold number of clan members are participating, then the clan component 230 next determines whether the current calendar date is also a game date according to the clan calendar, as described in block 725. If the current calendar date is not a game date, then the clan component 230 will determine which of the non-participating clan members (i.e., clan members who are not participating in the multiplayer video game) have authorized out-of-game communications (i.e., communications sent to a device not engaged in a multiplayer video game and which may not even be logged into the game service 110) as described at step 730. A clan member may authorize these types of communications and that authorization may be stored as clan data or with a member profile. If authorized, the clan component 230 may automatically send an email or other message to the email address and/or phone number associated with the clan members who are not logged into the game service 110 as described at step 735. The email or text message may be used to notify the clan member which members of the clan are logged into the game service 110 (e.g., by gamer tag or other identifier) and the title of the multiplayer video game that is being played so that the clan member can decide whether to login to the game service 110 to join the multiplayer video game. Other data that can be included in message includes, but is not limited to, the length of time that the clan members have been playing the video game. This messaging feature can facilitate the establishment of ad hoc clan games. The message from the game server to the mobile phone and/or the response from the mobile phone to the gamer server can be provided in a variety of forms, such as an SMS message, an email message, an MMS message, and combinations thereof.

Instant messaging (IM) can be employed between the clan member who is not logged into the game service 110 and one of the clan members engaged in the multiplayer game. For instance, the non-participating clan member (meaning a clan member who is not logged into the game service) can structure a short yes or no question or other message which is sent via a smart phone or other device to the game server/game service 110 via the cellular network, then from the game server to the game console of a participating clan member in game (perhaps appearing in a header or footer region of the video game image displayed by the game console), wherein the user of the game console may simply answers the question yes or no by quickly tapping one or more buttons on a game controller connected to the game console or a headset thereof. For example, a simple yes/no question might be "Do you plan to play for at least another hour?"

The message from the mobile phone can be displayed within a video game image that is projected by a display (e.g., a television or projector) connected to the game console, wherein the message is displayed without suspending game play of the video game. For example, the game console might simultaneously display live action game play simultaneously with the message. The video game application can also continue to process game play inputs from the game controller (as well as display the resulting game play outputs, such as movement of an object or character in the video game) while simultaneously displaying the message. The game play inputs can be input to the game controller by a thumbstick, D-pad, surface buttons or other input mechanism as described herein. The computer readable instructions implementing the message functionality of the game console can be associated with the operating system of the game console, one or more video game applications stored on the game console, or a combination thereof. The game server can append additional data to the message from the mobile phone as it transmits the message from the mobile phone to the one or more game consoles. For instance, the game server may append data associated with the member profile of the user of the smart phone, such as the gamer tag of the gamer. Computer readable instructions associated with the game server can identify the member profile (and the member profile data such as the gamer tag) by matching the telephone number of the mobile phone with the phone numbers stored in the member profiles of the gaming community. The gamer tag and/or the telephone number of the user of the mobile phone may be encoded by the game server and transmitted with the message to the game console so that both the message and encoded data can displayed by the game console without suspending game play.

Figure 8:
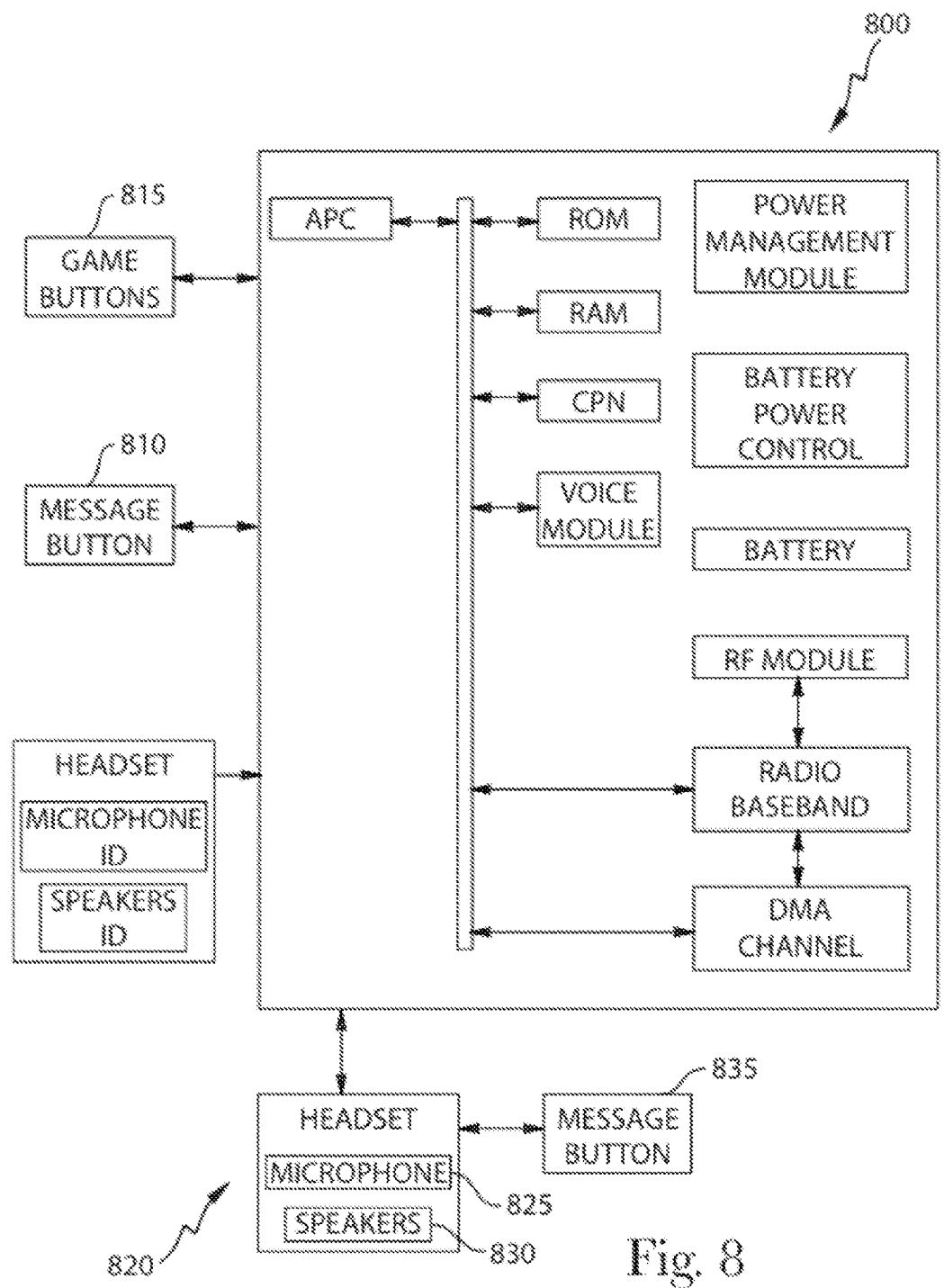
FIG. 8 is a schematic illustration of a game controller suitable for use with the process of FIG. 7.
Figure 15D:
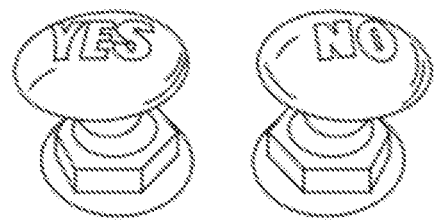
Figure 15F:
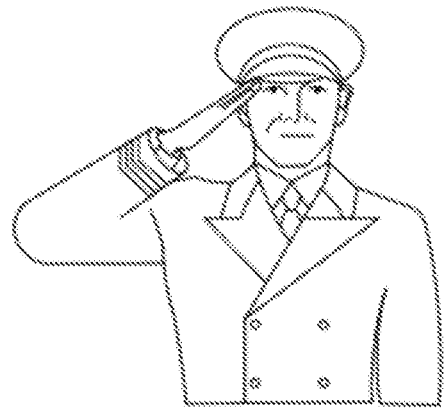
Figure 15J:
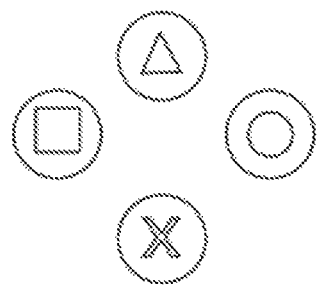

Referring to FIG. 8, in one embodiment, a button for replying yes or no to the message from the mobile phone may be provided as one or more dedicated surface buttons 810 on the game controller 800, wherein these button(s) are separate and distinct from controller buttons 815 dedicated to providing inputs to the video game. The game controller is in data communication with the game console, which may be provided by either a wired or wireless data connection thereto. In another embodiment, a headset 820 having a microphone 825 and speakers 830 that connects to the game controller 800 may have one or more dedicated buttons 835 for messaging. The buttons 835 can permit the user of the game console to either respond yes or no (or other affirmative/negative reply), or with another pre-identified message group, by depressing the button 835. The pre-identified message groups can be binary, tertiary, or quaternary. The game controller, headset or other attachment can comprise a message button for each type of reply, so 2 buttons for a binary reply, 3 buttons for a tertiary reply (e.g., yes, no, maybe or other affirmative/negative/intermediate reply), and four buttons for a quaternary reply. Examples of other replies that can be provided by the game console include a positive adverb and a negative adverb, a positive gerund and a negative gerund, and a positive graphic and a negative graphic. Examples of positive and negative graphics include a smiling facial and a frowning facial graphic, a thumbs up graphic and a thumbs down graphic, and a salute graphic and a raised middle finger graphic. Predetermined textual replies can include in/out, playing/not playing, and good/bad. Non-limiting graphical responses that can appear on a display are included in FIGS. 15A-15J. FIG. 15A illustrates an example of a thumbs up/thumbs down graphic. FIG. 15B illustrates an example of a smiley face/sad face. FIG. 15C illustrates an example of a plus/minus reply. FIG. 15D illustrates an example of a yes/no reply. FIG. 15F illustrates an example of a salute. FIG. 15G illustrates an example of a tertiary reply, exemplifying yes/no/maybe, where yes is indicated as the response. FIG. 15H illustrates a binary response utilizing two colors for response. FIGS. 15I and 15J illustrate an example of a quaternary reply, replicating controller buttons on the screen for ease of identification.

In another embodiment, the user of the game console can toggle on an audio response, where he or she can speak into the microphone 825 to send an audio response to the user of the mobile phone (e.g., the non-participating clan member). The audio response can be converted to text by an audio to text converting component of the clan component 230 and sent as a traditional email or merely sent as voicemail. Alternatively, a real time interactive audio dialog between a user of the smart phone and the user of the game console can be initiated using a voice over internet protocol, wherein audio data is transmitted from the game console to the game server, from the game server to the cellular network, and from the cellular network to the mobile phone. Thus, the reply from the game console can comprise audio data, text data, and combinations thereof.

The response is sent to the game service 110 and routed to an email address or telephone number of the non-participating clan member. The game service 110 may limit the number of IM questions from non-participating clan members so as not to be disruptive to game play of the video game. In this way, however, simple non-intrusive messaging and responses can occur between a clan member engaged in a multiplayer video game and a non-participating clan member who may not even be logged into the game service 110.

Figure 9:
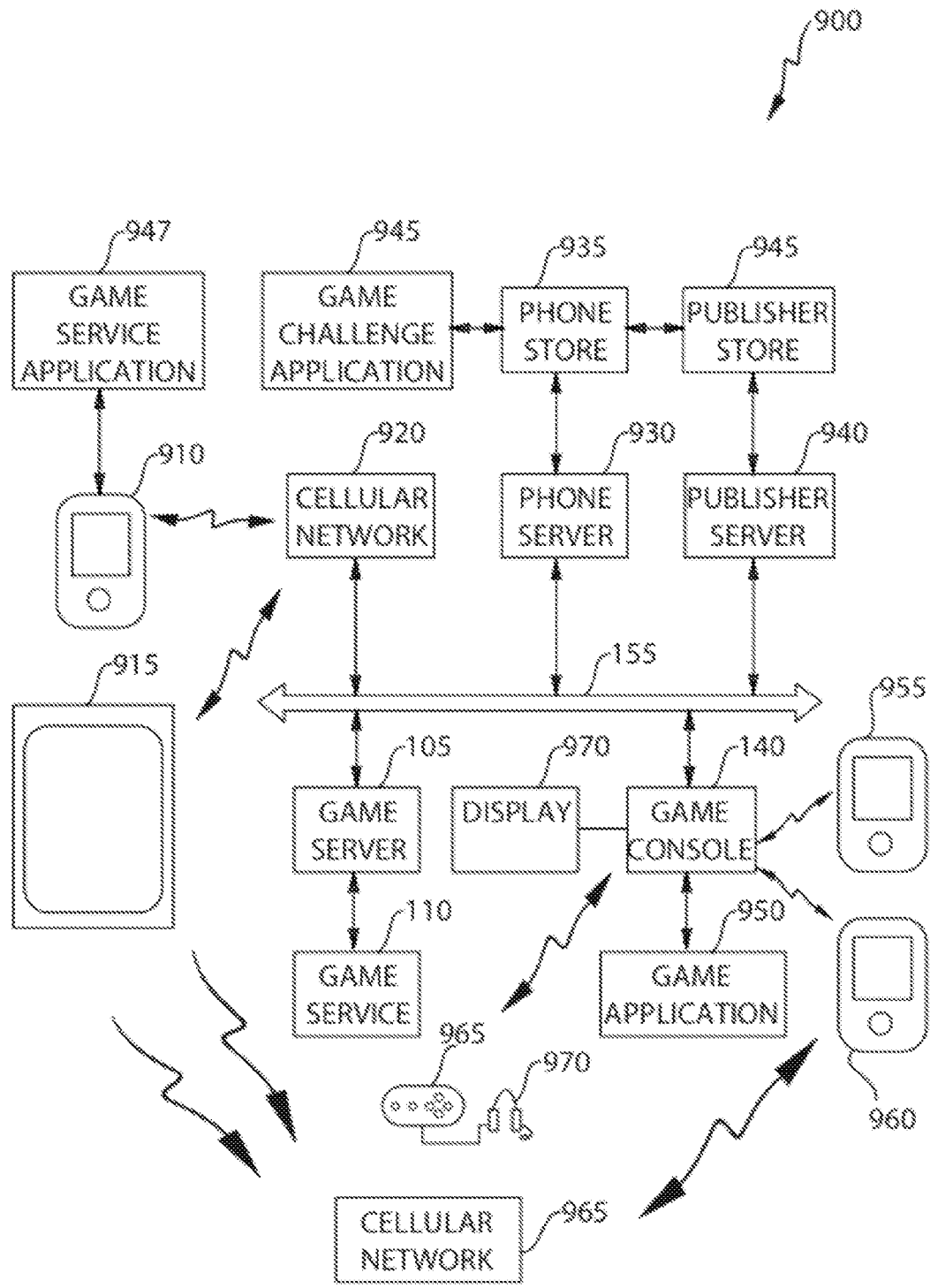
FIG. 9 is a schematic illustration of another computer system in accordance with the present invention.

Referring now to FIG. 9 and in accordance with another aspect of the present invention, devices and methods for communicating between one or more of a smart or mobile phone, cellular network associated with a mobile phone service, a phone server, a video game publisher server, a gamer server, a game service, a video game application, and a game console will now be described. The system 900 comprises a smart phone 910 (and/or a smart tablet 915) in voice and/or data communication with the cellular network 920. The smart phone 910 sends and receives radio signals with any number of cell site base stations fitted with microwave antennas (e.g., a cellular network) connected to a cabled communication network and switching system. The smart phone 910 may have a low-power transceiver that transmits voice and data to the nearest cell site. When the smart phone is turned on, it registers with the mobile telephone exchange, or switch, with its unique identifiers, and can then be alerted by the mobile switch when there is an incoming telephone call or message. Cell sites have relatively low-power (often only one or two watts) radio transmitters which broadcast their presence and relay communications between the smart phone 910 and the switch. The switch in turn connects the call to another subscriber of the same wireless service provider or to the public telephone network, which includes the networks of other carrier service providers. The mobile phone service is typically a telephone company (e.g., AT&T®, Verizon®, T-Mobile®, Sprint®, Boost Mobile®, Cricket®, Virgin Mobile®, US Cellular®, and TracPhone®) that provides services for mobile phone subscribers, such as the smart phone 910.

The cellular network 920 can be connected to the communication network 155, which in turn is in data communication with the game server 105/the game service 110 and the game console 140, as previously described. The network 155 may also be in data communication with a phone server 930 associated with a phone store 935. The phone server 930 may be owned and operated by the same manufacturer as the smart phone 910 and provides applications that may be downloaded and executed by the operating system of the smart phone 910. In one embodiment, the smart phone 910 can be an iPhone® manufactured by Apple, Inc®. and the phone server 930 is also operated by Apple, Inc.®, which allows users to browse and download applications from the iTunes Store® that were developed with the iPhone® SDK and published through Apple®. The network 155 may also be in data communication with a video game publisher server 940 having a publisher store 945 associated therewith. The video game publisher server 940 may be operated by the publisher of the video game application 950 (e.g., Activision®, Electronic Arts®, Ubisoft®, Micorsoft®, Sony Computer Entertainment®, Nintendo®, Take Two Interactive®, Bethesda Softworks®, Konami®, Sega®, etc.). The video game publisher store can be similar to the phone store and provides applications that can be downloaded to the smart phone 910 and executed by its operating system.

Mobile phones 955 and 960, either of which may or may not also be a smart phone, may be wirelessly paired to the game console 140. The mobile phones 955 and 960 may be paired to the game console using any wireless technology. In one embodiment, the mobile phones 955, 960 may be paired using the Bluetooth® technology standard. Bluetooth® is an open wireless technology standard for exchanging data over short distances (using short length radio waves) from fixed and mobile devices, creating personal area networks (PANs) with high levels of security. Bluetooth® is managed by the Bluetooth Special Interest Group. Bluetooth® uses a radio technology called frequency-hopping spread spectrum, which chops up the data being sent and transmits chunks of it on up to 79 bands of 1 MHz width in the range 2402-2480 MHz. Bluetooth® is a packet-based protocol with a master-slave structure. One master may communicate with up to 7 slaves in a piconet; all devices share the master's clock. The devices can switch roles, by agreement, and the slave can become the master at any time. At any given time, data can be transferred between the master and one other device. The master switches rapidly from one device to another in a round-robin fashion. Simultaneous transmission from the master to multiple other devices is possible via broadcast mode. Packet exchange is based on the basic clock, defined by the master, which ticks at 312.5 µs intervals. Two clock ticks make up a slot of 625 µs; two slots make up a slot pair of 1250 µs. In the simple case of single-slot packets the master transmits in even slots and receives in odd slots; the slave, conversely, receives in even slots and transmits in odd slots. Packets may be 1, 3 or 5 slots long but in all cases the master transmit will begin in even slots and the slave transmit in odd slots. Bluetooth is a standard communications protocol primarily designed for low power consumption, with a short range, 1 meter to 100 meters, but ranges can vary in practice based on low-cost transceiver microchips in each device.

A game controller 965 can be wirelessly connected to the game console 140. A headset 970 comprising speakers and a microphone may be connected to the game controller 965 or wirelessly connected to the game console 140. The game console can comprise computer readable instructions for transmitting audio data between the game console and headset 970 either directly or via the game controller 965. The audio data can include game audio data, such as music or sound effects audio, or voice data from other players (e.g., clan members) who are simultaneously playing the multiplayer video game. For example, two or more players may have an interactive, live conversation with each other where the audio data is transmitted from the microphone to one game console and then via the network 155 to the game server 105 and then to a second game console having a headset connected thereto (not shown) via the network 155.

In addition, the game console can comprise computer readable instructions for transmitting audio data between the game console and headset 970 and mobile phone 955 and/or 960 when the mobile phones are paired to the game console 140. While various embodiments are described hereafter with respect to audio data, it will be appreciated that text data can be substituted therefor and transmitted between the mobile phones and the game console. In one embodiment, the audio data can then be transmitted between one of the mobile phones 955, 960 and cellular network 965 and one of mobile phone 910 or smart tablet 915 which are located remote (e.g., a different building, a different city, a different state, etc.) from the game console 140. In this way, voice data from a user of the game console 140 can be transmitted to a user of a remote mobile phone and a live conversation can occur, wherein the user of the remote mobile phone may not be logged into the game service 110 and all the while game play of the video game is on-going. In other words, in one embodiment, the live conversation can occur without suspending game play, as discussed more fully hereafter.

The game console 140 can comprise computer readable instructions for pairing the mobile phones 955, 960 with the game console and for controlling the mobile phones 955, 960. In one embodiment, the computer readable instructions can enable the transmission of a telephone number associated with the smart phone 910 from the game console 140 to one of the mobile phones 955, 960 along with commands to transmit the telephone number to the cellular network 965 so as to connect one of the mobile phones 955, 960 with the smart phone (or another mobile phone) 910. The game console 140 can further comprise computer readable instructions that route incoming audio data to the mobile phones 955, 960 to the headset 970 to the exclusion of game play audio associated with the game application 950 so that a live conversation can be carried on between the user of the game console 140 and a user of the smart phone 910 without suspending game play associated with the video game application 950. When the mobile phones 955, 960 are not in use, the computer readable instructions can route the game play audio to the headset 970, which in some embodiments can include voice data from other gamers (perhaps clan members) who are participating in a multiplayer video game along with the user of the game console 140. Routing of audio data to the headset 970 can also be toggled by a user of the game console. For example, a button, switch or other input device on one of the headset or the game controller can be used to select whether game play audio or audio from the mobile phones 955, 960 are sent to the headset 970. Computer readable instructions on the game console 140 can implement the routing of audio depending upon the input provided by the user of the game console 140.

In one embodiment, a user of the smart phone 910 and the game console 140 are both members of a semi-permanent gaming clan, wherein the user of the game console 955 is also the custodian of the mobile phone 955. Clan data associated with the semi-permanent gaming clan can be stored on a computer readable medium associated with the game console 140, wherein the clan data includes the telephone numbers associated with the members of the clan including the telephone number associated with the smart phone 910. Alternatively, the telephone numbers can be stored as clan data on the game server and transmitted to the game console when needed. A user of the game console 140 can select the telephone number using one or more buttons or other input devices on the game controller 965, thereby initiating transmission of the telephone number to one of the mobile phones 955, 960 to establish a cellular network connection between the smart phone 910 and one of the mobile phones 955, 960.

In another embodiment, the game server 105 can transmit a telephone number and/or text message from the smart phone 910 to the game console 140, which can comprise computer readable instructions for displaying the telephone number and/or text message within a video game image projected by a display 970 connected to the game console 140 (via a video interface port). The telephone number and/or text message may be displayed without suspending game play of a video game. In other words, the user of the game console can continue game play while the telephone number and/or text message is simultaneously displayed and the user of the game console can respond to the message while simultaneously continuing the game play. If a user of the game console 140 desires to communicate with the user of the smart phone 910, the user can provide an input to the game console 140 for the computer readable instructions to transmit the telephone number to one of the mobile phones 955, 960 and instructing the mobile phone to transmit the telephone number to the cellular network 965 to thereby place one of the mobile phones 955, 960 in data communication with the smart phone 910.

Figure 7:
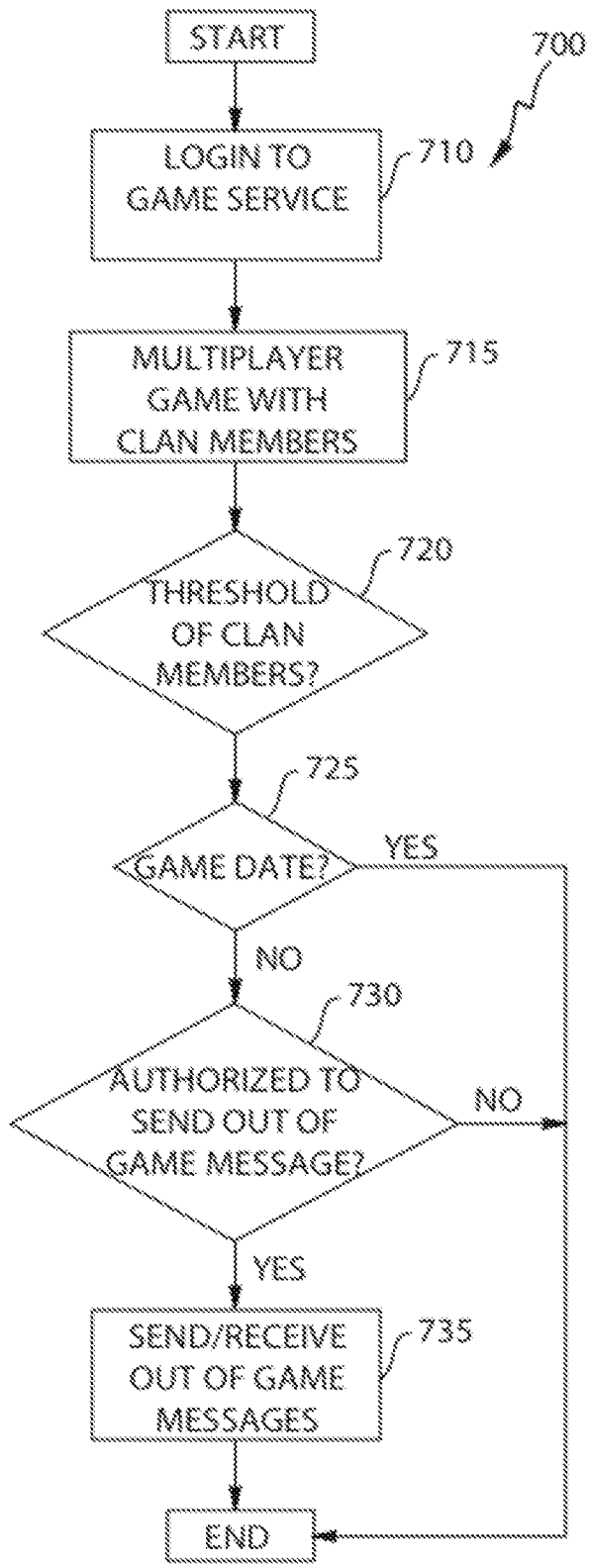
FIG. 7 is a flow diagram for an unscheduled game.

In one embodiment, the game server 105 can transmit the telephone number and/or text message to the game console 140 as part of process 700 shown in FIG. 7. For example, if a predetermined number of clan members are playing a multi-player video game, a message (e.g., a text message) may automatically be sent by the game server 105 via the network 155 and the cellular network 920 to the smart phone 910. A user of the smart phone 910 can send a reply to the game server 105 which is transmitted as a message to the game console 140, as discussed above. The user of the game console 140 may choose to provide, for example, a binary reply back the smart phone 910 via the game server 105/network 155/cellular network 920 or initiate an audio connection directly using one of the mobile phones 955, 960.

In still yet another embodiment, the game console 140 (and/or game server 105) can comprise computer readable instructions implementing one or more filters or rules for routing audio data between the smart phone 910 and the game console 140. For example, a user of the smart phone 910 can input and store a numerically ranked hierarchy of the clan members who may have a message transmitted to their game console 140. In one embodiment, the user of the game console 140 may be listed first in the hierarchy and in the event the game console 140 is not logged into the game service 110, the game console of the clan member next in line who is logged into the game service 110 will receive the message from the smart phone 910. In another embodiment, the computer readable instructions can contain a rule or filter where messages are transmitted between the smart phone 910 and the game console 140 if a particular multiplayer video game is being played by a plurality of clan members.

In accordance with another aspect of the present invention and with reference to FIGS. 9 and 10, methods, devices and systems for providing educational content and unlocking game prizes associated with video game will now be described. An education application 945 associated with the game application 950 may be downloaded to the smart phone 910 by a member of a clan. The education application may be downloaded from one of the phone server 930, the publisher server 940, the game server 105, or any other server connected to the network 155. For purposes of discussion only, the education application 945 will be discussed as if downloaded from the phone server 930 via the phone store 935 that are associated with the manufacturer of the smart phone. One example of a phone store is the (tunes Store® by Apple, Inc®. The education application 945 may be offered for free or for a fee.

While the education application 945 is associated with a video game (such as Red Dead Redemption®), it does not provide the same game play of the video game application 950 executed by the game console 140. Instead, the education application 945 provides an educational experience to the user of the smart phone 910 which, when successfully completed, unlocks a unique game prize such as a weapon, map, skin or other game related content that may be employed in the video game. Virtual currency, game points, or recognition on a leaderboard might also be awarded for a successful completion of the educational content. Since the complex 3D graphics, audio processing, artificial intelligence, game controller inputs, etc. necessary for a video game are not implemented by the education application, the education application is more readily suited for use on a smart phone or other mobile device having more limited data processing capabilities and download bandwidth, which can vary by geographical location of the smart phone 910.

In one embodiment, the education application 945 provides educational content based upon one or more themes associated with the video game or game play within the video game. The audio/visual content can comprise text, photos, audio, video, and combinations thereof. The audio/visual content may be provided in a markup language, such as HTML, XML, SCRIBE, GML, SGML, XHTML, and combinations thereof, which can be transmitted over the network 155 using an Application Layer protocol, such as Hypertext Transfer Protocol (HTTP). The audio/visual content can be provided in an interactive form, wherein the user of the smart phone 910 can interact with the audio/visual content to change what is presented, the order in which it is presented, or how it is presented. Optionally, a quiz at the end the educational content may be used to reinforce the educational content and verify successful viewing of the content and provide a learning opportunity (i.e., viewing and retention of the educational content). For example, if the video game is set in the American Wild West during the $19^{th}/20^{th}$ century, such as in the video game Red Dead Redemption® by Rockstar Games, Inc.®, the educational content may relate to a theme associated with this time period or locale. One theme could be the history of the California Gold Rush, or the history of the Western Railroads, or the history of weapons of the Wild West, or the history of the Telegraph, or the history of certain western frontier towns, or the history of outlaw gangs, etc. Thus, the education application, in combination with a reward or prize connected to game play within the video game that is unlocked when the audio/visual content has been successfully viewed, can be used to bring an educational aspect to most video games. This can be an important point of differentiation for a video game in the marketplace, particularly for parents, and provides an alternate forum for motivational learning for children. Broadly, educational content can be any content that prepares a learner with knowledge, skills, or abilities that can be applied immediately upon completion. In one embodiment, the educational content is associated with one or more of the areas of history, civics, mathematics, geography, science and technology.

Figure 10A:
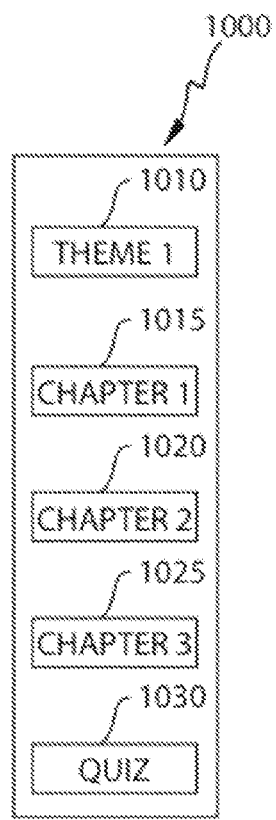
FIGS. 10a, 10b, and 10c are schematic illustrations of various arrangements of educational content in accordance with the present invention.
Figure 10B:
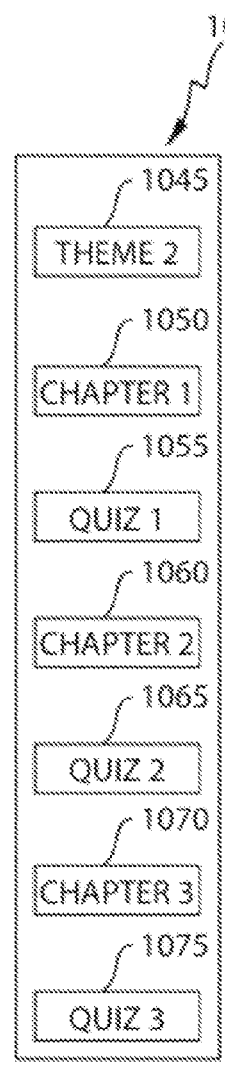
Figure 10C:
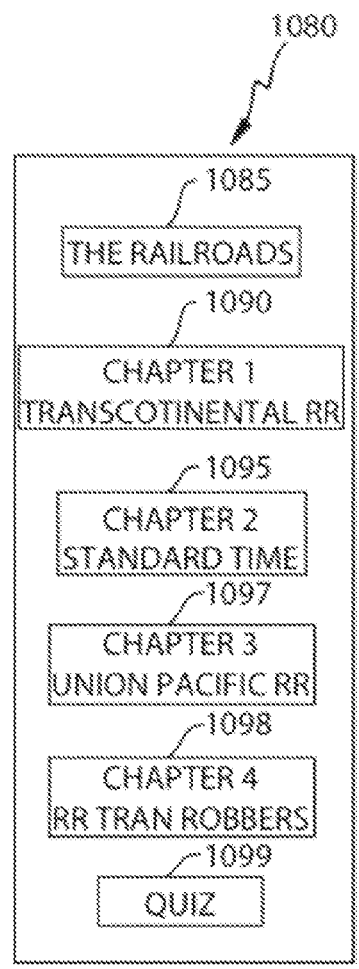

Referring now to FIGS. 10a, 10b, and 10c, some examples of educational audio/visual content arrangements, as might be sequentially displayed by a smart device, are illustrated. FIG. 10a illustrates an arrangement 1000 where the content is associated with a first theme 1010 and is divided into three chapters 1015, 1020, and 1025. Each chapter can provide educational content on a different topic associated with the theme 1010. A user of the education application 945 progresses thru each chapter sequentially by reviewing the audio/visual content associated with that chapter, which can either streamed sequentially or downloaded at one time and stored on a computer readable medium of the smart device. An interactive quiz 1030 after the last chapter 1025 can be used to test for satisfactory completion of the theme 1010 by testing recollection of the audio/visual content that was provided. In an alternate embodiment, an arrangement 1040 can comprise a quizzes 1055, 1065, and 1075, wherein a quiz follows each chapter 1050, 1060, and 1070, as shown in FIG. 10b. Computer readable instructions associated with the education application can implement the quizzes (e.g., storing the answers on a computer readable medium, scoring the quizzes to determine whether there the user passed or failed, etc.). FIG. 10c illustrates a practical example associated with a theme 1080 ("The Railroads") having a first chapter 1090

("The Transcontinental Railroad"), a second chapter 1095 ("Standard Time"), a third chapter 1097 ("Union Pacific Railroad"), and a fourth chapter 1098 ("Great Railroad Train Robberies"). Each of these chapters is associated with the theme 1080. A quiz 1099 is provided after the last chapter. The amount of time required to view the audio/visual content for each chapter can vary, but in some embodiments may be greater than 5 minutes, or greater than 10 minutes, or greater than 30 minutes, or greater than 45 minutes and/or less than 60 minutes, or less than 40 minutes, or less than 20 minutes. The quizzes can comprise a plurality of questions having pass/fail criteria associated therewith that are transmitted to the education application 945 from a server. The questions can be in the form of yes/no, multiple choice or fill in the blank type questions, which can be answered using radio buttons, dedicated keys on a keyboard, or entering text via a keyboard associated with the smart phone 910. The pass/fail criteria can comprise answering each question correctly or only a certain percentage (e.g., 70%) may require a correct answer in order to pass the quiz.

Figure 11:
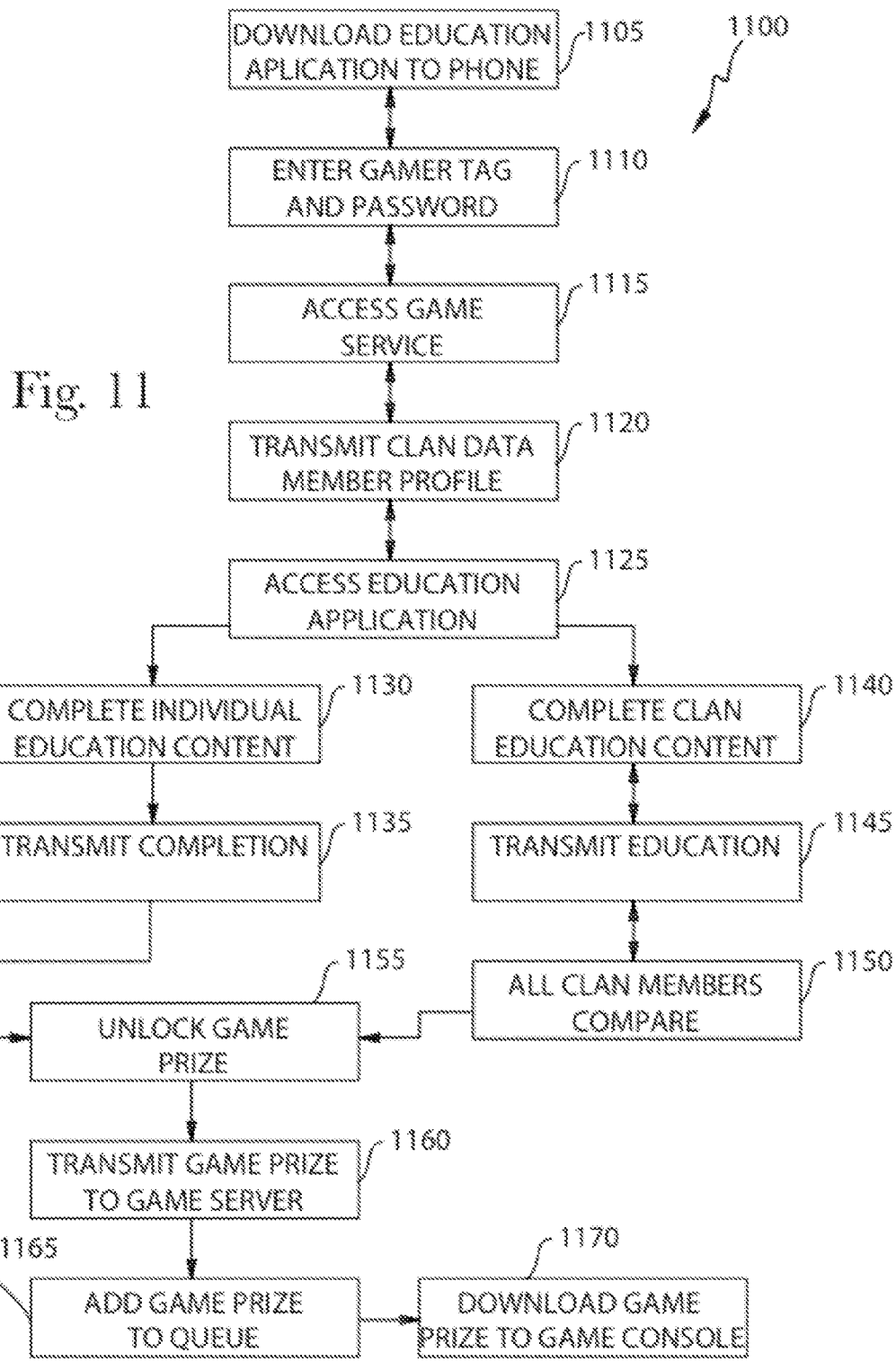
FIG. 11 is a flow diagram for accessing the educational content shown in FIGS. 10a, 10b and 10c.

Referring now to FIGS. 9 and 11, one of many processes 1100 associated with an education application 945 will now be described. A user of the smart phone 910 can download the education application 945 from the phone store 935 via the networks 155, 920. After downloading the education application 945 to the smart phone 910, the user of the smart phone can execute the education application 945. The education application 945 may access the game service 110 associated with the game community 115 by transmitting personally identifiable information of the smart phone user, or other login data such as a gamer tag and password, to the game service 110 of the game server, as shown at blocks 1110 and 1115, via a cellular network and a server associated therewith. The gamer tag and password may be provided as an input to the education application of the smart phone by use of a touch screen or buttons thereof. After validating the gamer tag and password, the game service 110 can transmit the member profile and/or clan data of the user to the education application 945 at block 1120, thereby unlocking full access to the education application 945 and/or the game service. The clan data can include a list of those members of the clan that have already completed viewing of the audio/visual content associated with a video game application. The member profile data and/or clan data can be used to personalize the visual appearance of education application 945 on the smart phone 910. A listing of the games that have been purchased or downloaded by the user of the smart phone 910 to their game console 140 (the listing of games being stored as data on a computer readable medium associated with the game server) can also be transmitted to the smart phone 910 as part of the member profile or clan data. The listing of games may be limited to those games that have been determined, by the game service, to be common among the members of the gaming clan. The listing of games can be used by the education application 945 to identify what audio/visual content is available for the video games in the game listing. The audio/visual content associated with each video game will be different. The audio/visual content for the education application may be stored on a computer readable medium associated with the game server or the publisher server 940. Once transmitted to the smart phone, the audio/visual content may also be stored on a computer readable medium associated with the smart phone. At block 1125, a user selects the audio/visual content associated with a video game application on the user's game console, and the content may then be downloaded (or streamed) to the smart phone 910 from the publisher server 940 (or game server), wherein the publisher server is owned, operated by, or affiliated with the publisher of the video game application. In some embodiments, the user of the smart phone may purchase the audio/visual content using the virtual currency account and virtual currency described elsewhere herein. For instance, if a user of the smart phone 910 selected the educational audio/visual content for the video game Red Dead Redemption®, the educational audio/visual content could be downloaded or streamed from the video game publisher's server to the smart phone. The educational content can comprise video data, audio data, text data, and combinations thereof. While the audio/visual content is described herein as downloadable from the publisher server 940, it will be appreciated that other servers, such as the game server 105 or the phone server 930, may take the place of the publisher server 940 and provide the functionalities described herein, including one or more of interfacing with the education application 945, transmitting the audio/visual content to the smart phone 910, and transmitting an unlocked game prize to one or more game consoles 140. Once downloaded, the educational audio/visual content can be viewed by the user of the smart phone 910 as previously described. Upon successful completion of the audio/visual content (block 1130), optionally by successful completion of the quizzes associated with the audio/visual content, the education application 945 can transmit data indicating successful completion of the audio/visual content to one of the publisher server 940, the game server 105 or the phone server 930, as described at block 1135. The completion data can include data indicating completion, the date when completed, the gamer tag associated with the education application, the title of the video game associated with the audio/visual content, and whether the completion was associated with an individual game prize or a clan prize, as described more fully hereafter.

After receiving the completion data from the education application 945, game prize can be unlocked in a variety of ways depending upon, for example, the programming language used for the video game application and method by which the game prize is implemented within the video game. In one embodiment, the game prize content is unlocked and the store 945 associated with the publisher server 940 transmits some or all of the game prize content to the gamer server/game service 110, where the game prize content can be placed in a download queue associated with the gamer tag that was transmitted with the completion data. It will be appreciated that the game prize may vary between video games so that completion of the audio/visual content associated with a first video game may be different than the game prize unlocked for completion of audio/visual content associated with a second video game. Alternatively, the publisher server 940 can transmit data, such as the gamer tag associated with the education application 945, to the game server indicating that the game prize has been unlocked and the game prize content, which is stored on a computer readable medium associated with the game server, may then be made available for downloading to the game console associated with that gamer tag. In another embodiment, some or all of the game prize content may be embedded with the video game application (at the time of sale) and the game prize is unlocked by transmitting an unlock code to the game console. The unlock code can be transmitted to the game console by one of the game server or the publisher server when the completion data is transmitted from the smart phone to the game server or publisher server. In the latter embodiment, much or all of the code for implementing a game prize object is already a part of the video game application (e.g., a 3D engine, APIs and Libraries, etc.) and the unlock code unlocks accessibility/implementation of the video game application routines and sub-routines that enable use of the game prize in the video game. Other methods for unlocking the game prize may be implemented by those skilled in the art.

The game prize content is a unique reward available only to those members of the game community 115 (or a clan) who successfully complete the audio/visual content. The game prize content, in one embodiment, provides a unique upgrade to the single or multiplayer video game application associated with the audio/visual content. The game prize content can be provided in a variety of forms, including a unique weapon, a unique map, access to game hints, a unique skin, a unique skill or ability usable in the video game, game points, etc. for the video game associated with the audio/visual content. The game prize content may be stored on a computer readable medium associated with the game console 140 so that it is accessible by video game applications also stored thereon.

While process 1100 has been described with respect to an individual game prize that, when unlocked, is downloaded to an individual game console (e.g., blocks 1130 and 1135) or otherwise made available for use in the video game, process 1100 may also implemented with a clan where each member of the clan must successfully complete the audio/visual content of the education application in order to unlock a clan game prize that is thereafter automatically downloaded to the game console of each clan member. The clan game prizes available to a clan may be different than the game prizes available to an individual gamer. As described in block 1140, after each member of a clan successfully completes the educational audio/visual content associated with the same video game, the smart phone 910 of the clan member transmits completion data to a server (block 1145). Thus, a plurality of distinct smart phones 910 (one for each clan member) transmit the completion data for the education application 945 loaded on each smart phone 910 to the same server, which can be the game server 105, the publisher server 940, or the phone server 930, as previously described. Once all the clan members have successfully completed the audio/visual content, as described at block 1150, the clan game prize is unlocked and the game prize content can be downloaded to the gamer server 105 along with the gamer tags or clan identifier associated with the clan that completed the audio/visual content. The game prize content can then be placed in a download queue for each of the clan members to download to each of their respective game consoles when powered on and logged into the game service. Once the game prize is unlocked and stored on a computer readable medium associated with the game console, the game prize can be accessed by a video game application and incorporated into the game play of the video game. Alternatively, the game prize content may be embedded in the video game application and an unlock code can be transmitted to the game console to unlock the routines and/or subroutines that enable implementation of the game prize in the video game. Thereafter, game play data associated with the game prize may be transmitted by a first game console to the game server which in turn transmits the data to a second game console during the course of a multiplayer video game session.

While an educational experience is described herein, it will be appreciated that other experiences may be provided to unlock a video game prize. For example, a recreational experience associated with the video game may be provided by a recreational application. A recreational experience can be skill based, a puzzle, or game. Using the example of the video game Red Dead Redemption®, a poker game, dice game, or other simple Wild West themed games might be provided by the recreation application, successful completion of which unlocks unique game prize content for use in the video game.

In another embodiment, a video game application can comprise instructions for unlocking a multiplayer clan game prize when the members of the clan achieve a predetermined objective in the multiplayer video game associated with the video game application. The multiplayer clan game prizes described herein can include, but are not limited to, a game map, a weapon, a skin, game points, a game ability, an avatar, and combinations thereof.

Figure 12:
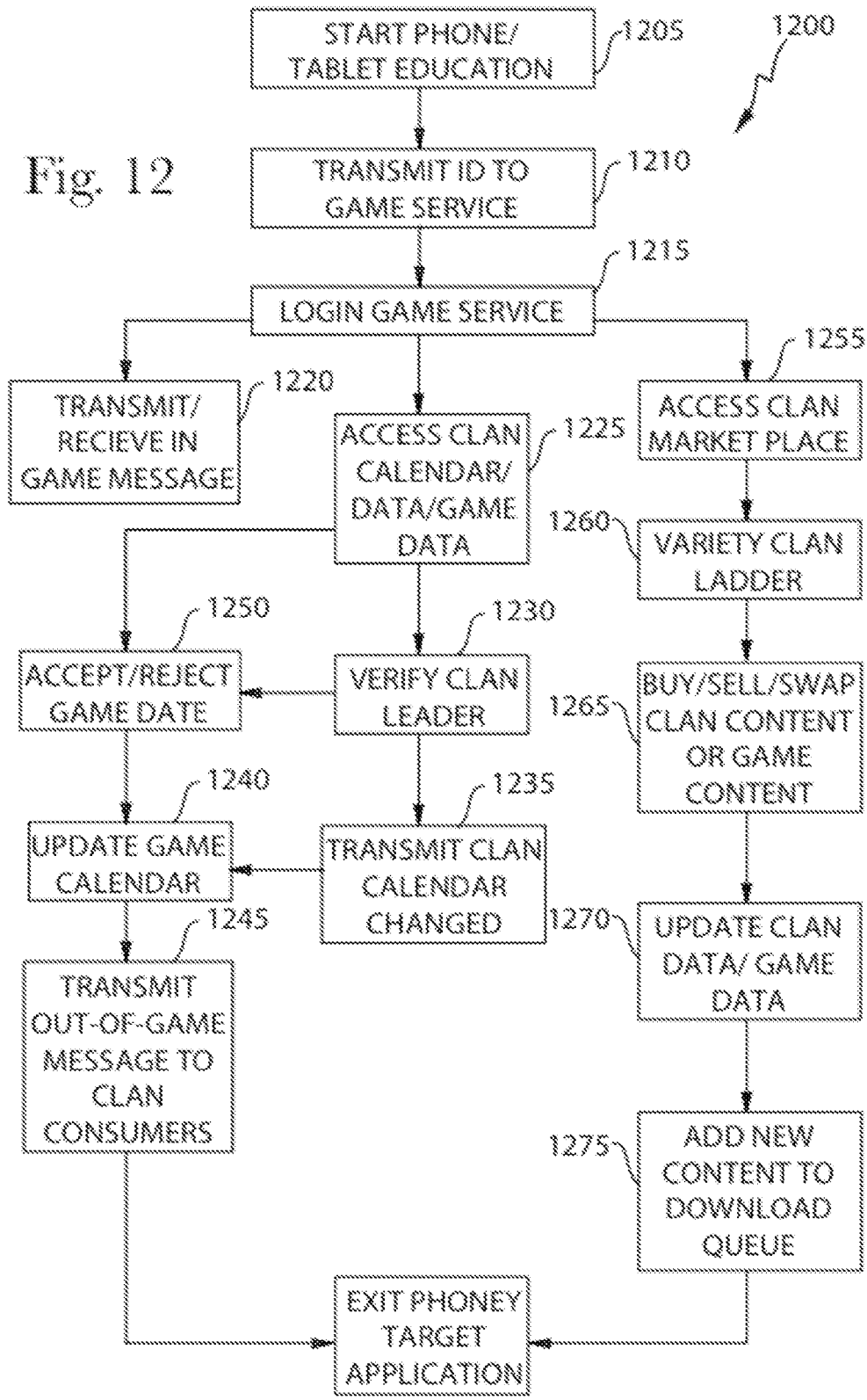
FIG. 12 is a flow diagram for a game service application.

Referring now to FIGS. 9 and 12, devices, systems and methods for implementing various aspects of the present invention will now be described. A game service application 947 is associated with the smart phone 910. The game service application 947 can be downloaded to the smart phone 910 from the phone store 935 as previously described with respect to education application 945. Upon first execution of the game service application 947, a gamer tag and password may be entered by the smart phone user and transmitted to the game service 110 via the cellular network 920 and the network 155 in order to login to the game service 110, as shown in blocks 1205, 1210, and 1215. Thereafter, the gamer tag and password can be stored with the game service application 947 in order to automatically login to the game service 110 when the game service application 947 is executed. Clan data and the member profile associated with the gamer tag can be transmitted to the smart phone 910 by the game service 110 via the network 155 and the cellular network 920. Upon logging into the game service 110, the user of the smart phone can access at least three functionalities (represented by the 3 branches of the process 1200). The user can send and receive in-game messages from other clan members (or even friends on a friends list) as shown in block 1220 and as previously described (although this functionality can also be implemented separate from the game service application as previously described). In the second functionality, the user of the smart phone 910 can interactively access a clan calendar and its associated data. For example, if the user is verified as the clan leader by the game service application 947 (block 1230), the smart phone user can input changes to the clan calendar (e.g., adding, deleting, modifying game dates; changing game date data, etc.) via the smart phone 910 and the data associated with the changes may be transmitted to the gamer service 110 via the network 155 and cellular network 920 as shown in block 1235. After which, the clan component 230 can update the clan calendar at block 1240 so that the changes are visible to other clan members who log into the game service 110. Optionally, an out-of-game message can be sent to the other clan members at block 1245 alerting them to the fact that changes have been made to the clan calendar. Alternatively, the user of the smart phone can accept or reject a game date at block 1250 or perform any of the other steps or actions described herein with respect to a clan calendar by exchanging data or inputs with the game service 110 via the network 155. Some or all of these functionalities can be implemented by computer readable instructions associated with one or more of the smart phone, game server and/or game console.

A third functionality, a clan marketplace and virtual currency account, will now be described. The clan component 230 of the gaming service 110 may further comprise computer readable instructions enabling a marketplace for the sale, purchase, and/or swapping of content with other clans, from the game service 110, and/or from publishers of the video games. The marketplace can be accessed via the game service application 947 associated with the smart phone 910 (or smart tablet) or via a game console. Members of the clan can purchase virtual currency (i.e., currency that may only be used within the game service 110) individually and then transfer some or all the currency to the clan account. Monthly dues can be set up where a set amount of virtual currency is transferred automatically to the clan account each month from each clan member.

The clan leader may be authorized to spend the virtual currency of the clan account for downloadable/transferable content that is available to the clan as a group. Unique avatars may be available from the game service 110 for clans, and the clan leader can purchase a clan avatar, avatar apparel, etc. for the benefit of each member of the clan. Unique game maps, weapons, etc. may be available for purchase by a clan only, after which the purchased content is made is available only for clan game play (v. single player game play, thereby encouraging clan participation). This content may be made available to a video game application using the same or similar methods as previously described herein with respect to the clan game prizes.

Clan game prizes, which can be unlocked as described herein, may also be content that is available to be purchased, swapped, or sold in the marketplace. A clan can place weapons, maps, etc. up for sale to other clans or these items can be swapped with other clans without the payment or receipt of virtual currency. Points, perks, trophies, or other awards can be made available to a clan as they are successful against other clans in video games. These points, perks, trophies, etc. can be sold or swapped in the clan marketplace. Special rates may even be established for the purchase of maps, weapons, etc. in bulk by a clan versus an individual member of the gaming community purchasing these items separately, thereby encouraging clan participation. A set of computer readable instructions associated with the game server can transmit purchased/swapped content from the game server one or more game consoles. Relatedly, the set of computer readable instructions can also transmit data to one or more game consoles indicating that game content that has been sold (or swapped) in the marketplace is to be deleted from the computer readable medium associated with the game console or otherwise locked from further use in a video game, such as by transmitting a lock code to the video game application on a game console in order to disable the routines and/or subroutines of the video game application that enable the use of the game content in the video game.

After accessing the clan marketplace via the game service application 947 at block 1255 and verifying that the user of the smart phone 910 is a clan leader (block 1260), the clan leader can buy, sell, swap or conduct other transactions via the game service application 947, wherein the data associated with the transactions is exchanged with the game service 110 via the network 155 and cellular network 920. The data can comprise the game content that is purchased, sold or swapped, instructions to perform the various transactions, data associated with the virtual currency account (e.g., values for an account balance, an account debit, or an account credit), etc. New content purchased or swapped in the game marketplace by the clan leader can be placed in a download queue for download to the game consoles of each clan member when the respective game console is powered on (block 1275). Alternatively, an unlock code may be transmitted from the game server to the game console to unlock the content that was purchased or swapped, wherein the content is already embedded in the video game application. The game consoles can comprise computer readable instructions for then storing the content on a computer readable medium associated with the game console. The game service 110 can also update clan data and/or game data in the event that game content is sold by the clan leader. While the marketplace has been described herein as accessible via a smart phone, it will be appreciated that the same functionalities can be implemented by computer readable instructions associated with a game console thereby enabling a user of the game console to perform the same functions.

Figure 13:
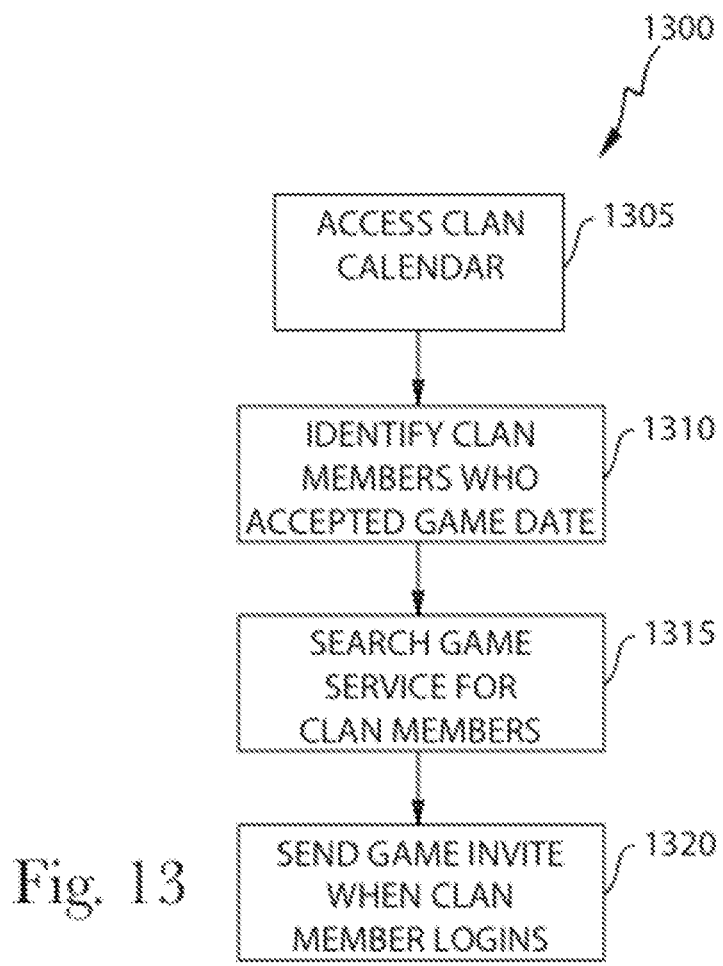
FIG. 13 is a flow diagram for a multiplayer game session.

Referring to FIGS. 2 and 13 and in accordance with still another aspect of the present invention, methods, devices and systems for managing a multiplayer game will now be described. In order to facilitate a scheduled game session, the clan component 230 (or a video game application stored on a computer readable medium associated with the game console) can access the clan calendar data stored on the computer readable medium associated with the game server (or stored on the computer readable medium associated with the game console) to identify which clan members accepted a game date and periodically search the game service between the game start time and game end time for those clan members who log into the game service 110, as shown in process 1300 and blocks 1305, 1310, and 1315 thereof. The search can be for the gamer tags of the clan members who have logged into the game service and who also accepted the game date. When such a clan member logs into the game service 110 from a game console and is identified by the clan component 230, the clan component 230 (or the video game application) can automatically send a game invite to the clan member to invite them to the multiplayer game (block 1320). Thus, the clan leader (or other organizer of the multiplayer game) is relieved of monitoring for clan members once game play of a video game has started and manually sending game invites to those clan members who logon to the game service 110 after the game start time. While this above described functionality is described as implemented by either a video game application or the clan component, it will be appreciated that portions of the functionality can be distributed between the two applications. For example, searching for the clan members who have logged into the game service can be performed by the clan component, which transmits the gamer tag(s) of those clan members who are logged into the game service to a game console that is executing the video game application associated with the game date. The video game application associated with the game console can perform the function of sending a game invite, via the game server, to the game console associated with the clan member who has logged into the game service. It will be appreciated that these functionalities provided by the video game application can be incorporated into a plurality of video game applications stored on a computer readable medium associated with the game console.

In an alternate arrangement, any clan member who logins into the game service 110 during a multiplayer game involving the clan can automatically receive a game invite from the clan component 230 irrespective whether the clan member had previously accepted or rejected the game date. Whether a clan member receives these automatic game invites can be controlled as a preference in the member profile or the clan profile. In another embodiment, the clan component 230 can automatically send game invites to the clan members who both accepted the game date and who are logged into the game service 110 when the clan leader initiates the multiplayer game.

Figure 14:
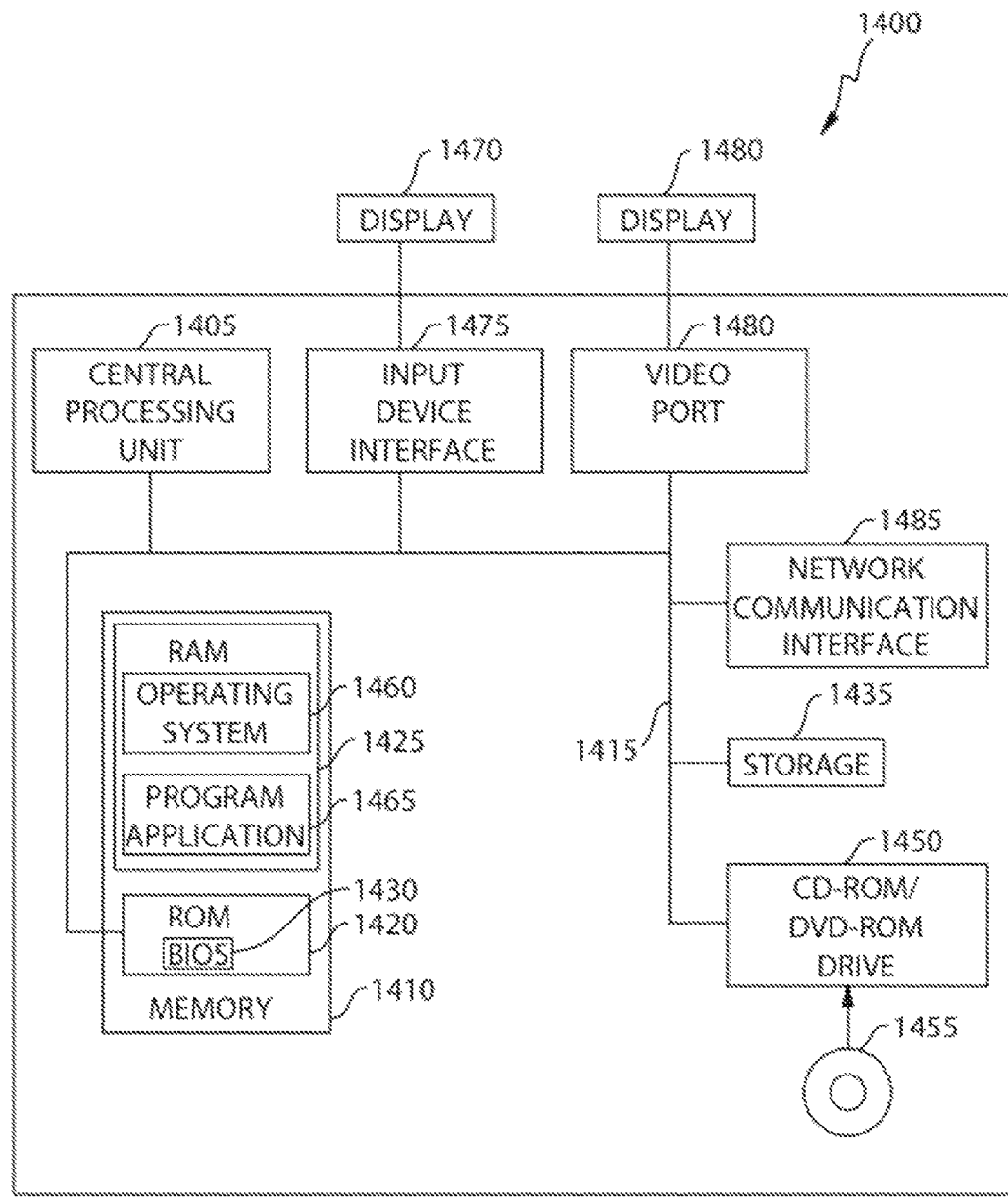
FIG. 14 is a schematic illustration of a computing device in accordance with the present invention.

Various computing devices (e.g., servers, smart phones, smart tablets, game consoles, game controllers, etc) have been described herein as suitable for use with the present invention. While these devices can provided in a variety of forms (some of which have been described herein), FIG. 14 illustrates an exemplary computing device 1400 that may be used to implement a server, game console, game controller, smart phone, smart tablet, or other computing device of the present invention according to one embodiment. In addition to components discussed previously herein, the exemplary computing device 1400 may also include a central processing unit (CPU) 1405, a system memory 1410, and a system bus 1415. The system bus 1415 provides an interface for system components including, but not limited to, the system memory 1410 and the central processing unit 1405. The central processing unit 1405 can be any of various commercially available or proprietary processors. Dual microprocessors and other multi-processor architectures may also be employed as the central processing unit 1405. The central processing unit 1405 can execute a set of stored instructions associated with an application, as described herein.

The system bus 1415 can be any of several types of bus structures that may further interconnect to a memory bus (with or without a memory controller), a peripheral bus, and a local bus using any of a variety of commercially available bus architectures. The system memory 1410 can include non-volatile memory 1420 (e.g., read only memory (ROM), erasable programmable read only memory (EPROM), electrically erasable programmable read only memory (EEPROM), etc.) and/or volatile memory 1425 (e.g., random access memory (RAM)). A basic input/output system (BIOS) 1430 can be stored in the non-volatile memory 1420, and can include the basic routines that help to transfer information between elements within the computing device 1400. The volatile memory 1425 can also include a high-speed RAM such as static RAM for caching data.

The computing device 1400 may further include a storage 1435, which may comprise, for example, an internal hard disk drive (HDD) (e.g., enhanced integrated drive electronics (EIDE) or serial advanced technology attachment (SATA)) for storage. The computing device 1400 may further include an optical disk drive 1450 (e.g., for reading a CD-ROM or DVD-ROM 1455). The drives and associated computer-readable media may provide non-volatile storage of data, data structures, computer-executable instructions, and so forth. For the computing device 1400, the drives and media accommodate the storage of any data in a suitable digital format. Although the description of computer-readable media above refers to an HDD and optical media such as a CD-ROM or DVD-ROM, it should be appreciated by those skilled in the art that other types of media which are readable by a computer, such as Zip disks®, magnetic cassettes, flash memory cards, cartridges, and the like, may also be used in the exemplary operating environment, and further, that any such media may contain computer-executable instructions for performing novel methods of the present invention.

A number of applications can be stored in the drives and volatile memory 1425, including an operating system 1460 and one or more program applications 1465, which implement the functionality described herein, including, for example, functionality associated with a video game, a game service, etc. and associated processing and functionality described herein. It is to be appreciated that the embodiments can be implemented with various commercially available operating systems or combinations of operating systems. The central processing unit 1405, in conjunction with the applications 1465 in the volatile memory 1425, may serve as a control system for the computing device 1400 that is configured to, or adapted to, implement the functionality described herein.

A user may be able to enter commands and information into the computing device 1400 through one or more wired or wireless input devices, for example, a keyboard and a pointing device, such as a mouse (not illustrated), or via the display 1470 where the display 1470 is a touch screen. Other input devices (not illustrated) may include a microphone, an infrared (IR) remote control, a joystick, a game controller, a game pad, a stylus pen, or the like. These and other input devices are often connected to the central processing unit 1405 through an input device interface 1475 that is coupled to the system bus 1415 but can be connected by other interfaces, such as a parallel port, an IEEE 1394 serial port, a game port, a universal serial bus (USB) port, an IR interface, etc.

The computing device 1400 may drive a separate or integral display 1480, which may also be connected to the system bus 1415 via an interface, such as a video port 1480. The computing device 1400 operates in a networked environment using a wired and/or wireless network communications interface port 1485. The network interface port 1485 can facilitate wired and/or wireless communications to the network 155. The network interface port can be part of a network interface card, network interface controller (NIC), network adapter, or LAN adapter.

The foregoing detailed description of the inventive systems, devices, and methods have been presented for purposes of illustration and description. It is not intended to be exhaustive or to limit the invention to the precise forms disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A game system, comprising:
   a game console comprising;
   a) a CPU;
   b) a computer readable medium;
   c) a network interface;
   d) an operating system stored on the computer readable medium;
   e) a video interface port for transmitting a video signal to a display;
   f) a system bus interconnecting the computer readable medium, the CPU, the network interface and the video port;
   g) a first video game application for providing game play stored, at least in part, on the computer readable medium;
   a smart phone connected wirelessly to a cellular network and to the game console, the connection to the game console being within a short range; and
   wherein the game console further comprises a set of computer readable instructions for:
   a) pairing the smart phone with the game console and controlling the smart phone;
   b) wirelessly transmitting a first phone number associated with a first gamer tag to the smart phone;
   c) receiving a first message wirelessly from the smart phone;
   d) receiving a second message from a first smart device via the network interface;
   e) displaying the first or second message within a video game image projected by a display connected to the video interface port or transmitting the first message or the second message to a speaker, wherein the first or second message is displayed or transmitted without suspending gameplay;
   f) transmitting a reply to the smart phone or the first smart device, wherein the reply is inputted to the game console without suspending game play.

2. The game system of claim 1, wherein the set of computer readable instructions further comprises instructions enabling a real time interactive audio dialog between a user of a second smart device in communication with the smart phone and a user of the game console.

3. The game system of claim 1, wherein the set of computer readable instructions further comprise instructions for routing audio data associated with the first message to a speaker associated with the game console to the exclusion of game play audio.

4. The game system of claim 1, further comprises a headset or game controller in data communication with the game console and one of the headset or the game controller further comprises an input device for selecting whether game play audio data or audio data associated with the first message is sent the headset.

5. The game system of claim 1, wherein the set of computer readable instructions further comprise instructions for receiving one of the first phone number and the first gamer tag from a game server.

6. The game system of claim 1, wherein the first phone number and the first gamer tag are stored on the computer readable medium.

7. The game system of claim 1, wherein the set of computer readable instructions further comprises instructions for displaying one of a second phone number or a second gamer tag when the second phone number or the second gamer tag are received as part of the second message.

8. The game system of claim 1, further comprising a game controller in communication with the game console and comprising an input mechanism for inputting the reply to one of the first or second messages.

9. The game system of claim 1, wherein the set of computer readable further comprise instructions for routing the first message to a speaker to the exclusion of game play audio associated with the first video game application.

10. A game system, comprising:
a game console comprising:
   a) a CPU;
   b) a computer readable medium;
   c) a network interface;
   d) an operating system stored on the computer readable medium;
   e) a video interface port for transmitting a video signal to a display;
   f) a system bus interconnecting the computer readable medium, the CPU, the network interface and the video port;
   g) a first video game application for providing game play stored, at least in part, on the computer readable medium;
a first smart device connected wirelessly to a cellular network and to the game console, the connection to the game console being within a short range; and
wherein the game console further comprises a set of computer readable instructions for:
   a) pairing the first smart device with the game console and controlling the first smart device;
   b) wirelessly instructing the first smart device to transmit a first phone number to a cellular network;
   c) receiving a first message wirelessly from the first smart device;
   d) receiving a second message from a second smart device via the network interface;
   e) displaying the first or second message within a video game image projected by a display connected to the video interface port or transmitting the first message or the second message to a speaker; and
   f) transmitting a reply to the first smart device or the second smart device, wherein the reply is inputted to the game console.

11. The game system of claim 10, wherein the set of computer readable instructions further comprise instructions for wirelessly transmitting the first phone number associated with a first gamer tag to the first smart device.

12. The game system of claim 10, wherein the computer readable medium stores a plurality of phone numbers as clan data and wherein the clan data further comprises information selected from the group consisting of an email address, a clan identifier, a clan class, a time zone, a native language, a list of video games, a list of game maps and combinations thereof.

13. The game system of claim 11, wherein the set of computer readable instructions further comprises instructions for receiving one of the first phone number and the first gamer tag from a game server.

14. The game system of claim 13, wherein the set of computer readable instructions further comprises instructions for displaying one of a second phone number or a second gamer tag when the second phone number or the second gamer tag are received as part of the second message.

15. The game system of claim 10, further comprises a headset or game controller in data communication with the game console and one of the headset or the game controller further comprises an input device for selecting whether game play audio data or audio data associated with the first message or the second message is sent the headset.

16. The game system of claim 10, wherein the set of computer readable instructions further comprise instructions for routing audio data associated with the first message to a speaker associated with the game console to the exclusion of game play audio.

17. The game system of claim 10, wherein the set of computer readable instructions further comprise instructions for communicating with a game server hosting a game service associated with a gaming community and wherein the set of computer readable instructions further comprise instructions for communicating with a message component of the game service.

18. The game system of claim 10, wherein the set of computer readable instructions further comprises instructions enabling a real time interactive audio dialog between a user of a third smart device in communication with the first smart device and a user of the game console.

\* \* \* \* \*